US008126642B2

(12) United States Patent
Trepagnier et al.

(10) Patent No.: US 8,126,642 B2
(45) Date of Patent: Feb. 28, 2012

(54) CONTROL AND SYSTEMS FOR AUTONOMOUSLY DRIVEN VEHICLES

(75) Inventors: Paul Gerard Trepagnier, Metairie, LA (US); Jorge Emilio Nagel, New Orleans, LA (US); Matthew Taylor Dooner, Jefferson, LA (US); Michael Thomas Dewenter, New Orleans, LA (US); Neil Michael Traft, New Orleans, LA (US); Sergey Drakunov, Port Orange, FL (US); Powell Kinney, Slidell, LA (US); Aaron Lee, Jamaica Plain, MA (US)

(73) Assignee: Gray & Company, Inc., Metairie, LA (US)

( * ) Notice: Subject to any disclaimer, the term of this patent is extended or adjusted under 35 U.S.C. 154(b) by 671 days.

(21) Appl. No.: 12/289,325

(22) Filed: Oct. 24, 2008

(65) Prior Publication Data

US 2010/0106356 A1    Apr. 29, 2010

(51) Int. Cl.
G01C 21/00 (2006.01)
G01C 21/34 (2006.01)
G01C 21/36 (2006.01)

(52) U.S. Cl. ........ 701/207; 701/206; 701/209; 701/301; 701/28; 180/167

(58) Field of Classification Search .................. None
See application file for complete search history.

(56) References Cited

U.S. PATENT DOCUMENTS

| | | | |
|---|---|---|---|
| 5,200,606 A | 4/1993 | Krasutsky et al. | |
| 5,644,386 A | 7/1997 | Jenkins et al. | |
| 5,870,181 A | 2/1999 | Andressen | |
| 6,844,924 B2 | 1/2005 | Ruff et al. | |
| 7,801,644 B2 * | 9/2010 | Bruemmer et al. | 700/249 |
| 2007/0156286 A1 * | 7/2007 | Yamauchi | 700/245 |
| 2007/0198145 A1 * | 8/2007 | Norris et al. | 701/23 |
| 2007/0219720 A1 | 9/2007 | Trepagnier et al. | |
| 2007/0291130 A1 | 12/2007 | Broggi et al. | |
| 2008/0161986 A1 | 7/2008 | Breed | |

OTHER PUBLICATIONS

Hongling Wang et al., "Steering Autonomous Driving Agents Through Intersections in Virtual Urban Environments", 2004 International Conference on Modeling, Simulation and Visualization Methods (MSV'04) pp. 1-7.

Ruggero Frezza et al., "A Lagrangian Formulation of Nonholonomic Path Following", pp. 1-17, 1998.

(Continued)

Primary Examiner — Michael J. Zanelli
(74) Attorney, Agent, or Firm — Oblon, Spivak, McClelland, Maier & Neustadt, L.L.P.

(57) ABSTRACT

A navigation and control system including one or more position sensors configured to generate position signals indicative of the location and heading of a vehicle. The system includes one or more operation control mechanisms having inputs and producing outputs which control an operation of the vehicle and includes a self-contained autonomous controller disposed remote from the operation control mechanisms. The autonomous controller includes a processor configured to receive the position signals from the position sensors and to generate operation control signals defining an updated travel path for the vehicle, and a programmable interface providing communication among the position sensors, the operation control mechanisms, and the processor. The programmable interface is configured to normalize inputs to the processor from the position sensors and to generate compatible operation control signals applied as the inputs to the operation control mechanisms, whereby the self-contained autonomous controller is configurable for operation with a variety of different sensors and different operation control mechanisms.

36 Claims, 18 Drawing Sheets

OTHER PUBLICATIONS

Jeff Wit, "Autonomous Ground Vehicle Path Tracking" Journal of Robotic Systems 21(8), pp. 439-449 (2004).

Carl D. Crane III, et al., "Autonomous Ground Vehicle Technologies Applied to the Darpa Grand Challenge", ICCAS2004, Aug. 25-27, 2004, The Shangri-La Hotel, Bangkok, Thailand, pp. 1-5.

Thomas Berglund, "An Obstacle-Avoiding Minimum Variation B-Spline Problem", Department of Computer Science and Electrical Engineering, Department of Mathematics, Lulea University of Technology, pp. 1-6, 2003.

David Coombs et al, "Visualizing Terrain and Navigation Data", National Institute of Standards and Technology, Intelligent Systems Division, pp. 1-7, 2007.

Lee Gomes, "Portals: Amateur Team Defeats Experts in Computer-Car Race", Wednesday, Oct. 19, 2005, Wall Street Journal, Copyright © 1997-2004 PG Publishing Co., Inc.

Paul G. Trepagnier et al., "Team Gray Technical Paper Darpa Grand Challenge 2005", Aug. 28, 2005, pp. 1-13.

Xiaohong Bao, et al. LOD-Based Clustering Techniques for Efficient Large-Scale Terrain Storage and Visualization, In Proceedings SPIE Conference on Visualization and Data Analysis, pp. 225-235, 2003.

2005 Darpa Grand Challenge, From Wikipedia, the free encyclopedia, pp. 1-5.

Dennis Ryan, DCMILITARY.COM, "Cars, Not Drivers, Star at Pentagon Courtyard" pp. 1-4, Dec. 9, 2005.

Scientific American. Com., Innovations from a Robot Rally, Dec. 26, 2005, pp. 1-5.

Mark Helmlinger, Roadtrip America, "Winning Strategies at the DARPA Grand Challenge," DARPA Grand Challenge 2005, pp. 1-4.

Stefanie Olsen, "URL:http://news.zdnet.com/2100-9584_22-5892115.html Primm Valley, Nev.—In life, and apparently in artificial life, timing is everything", pp. 1-3, Oct. 2005.

Defense Industry Daily, "Drivers not Wanted: DARPA's Grand Challenge 2005 Winners", posted Oct. 11, 2005, pp. 1-6.

U.S. Department of Energy—Energy Efficiency and Renewable Energy EERE News, EERE Network News, Oct. 19, 2005, pp. 1-4.

School of Engineering, News:: Past Articles:: 2005, "Tulane Robo Car Among Finishers", pp. 1-2.

Humphrey Cheung, "Money Isn't Everything to Mastering the Grand Challenge", published Wednesday, Oct. 12, 2005, pp. 1-6.

* cited by examiner

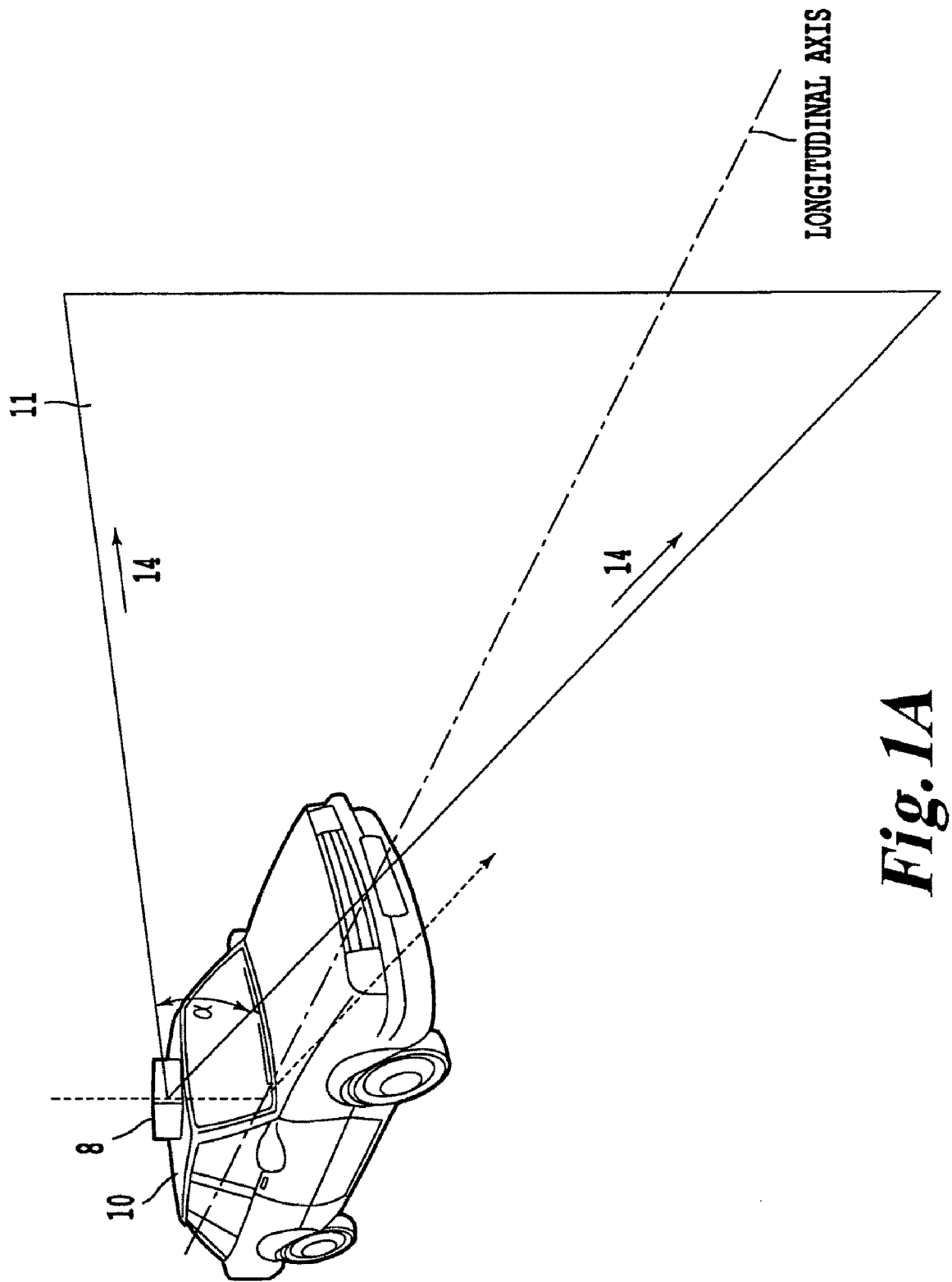

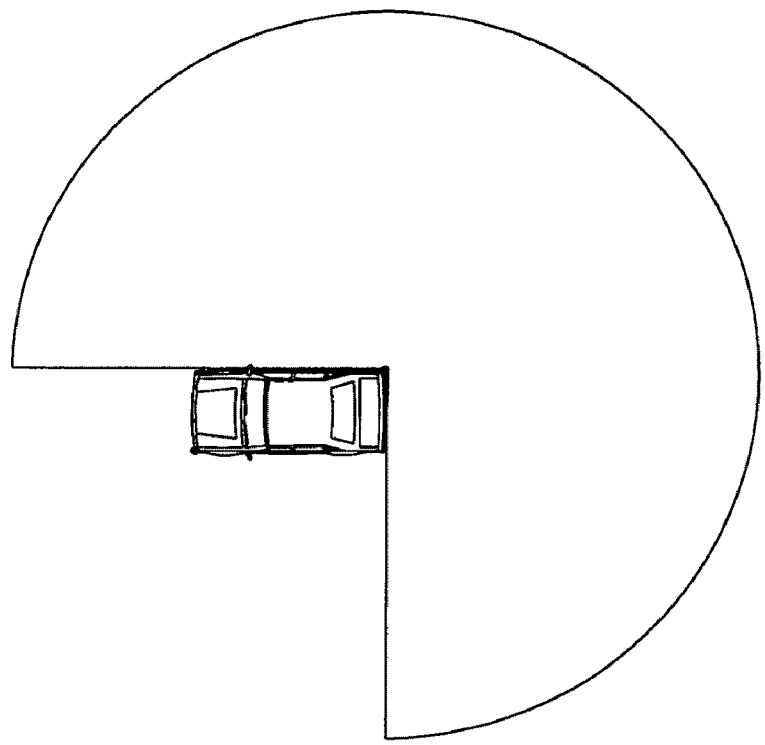
*Fig.3A(2)*
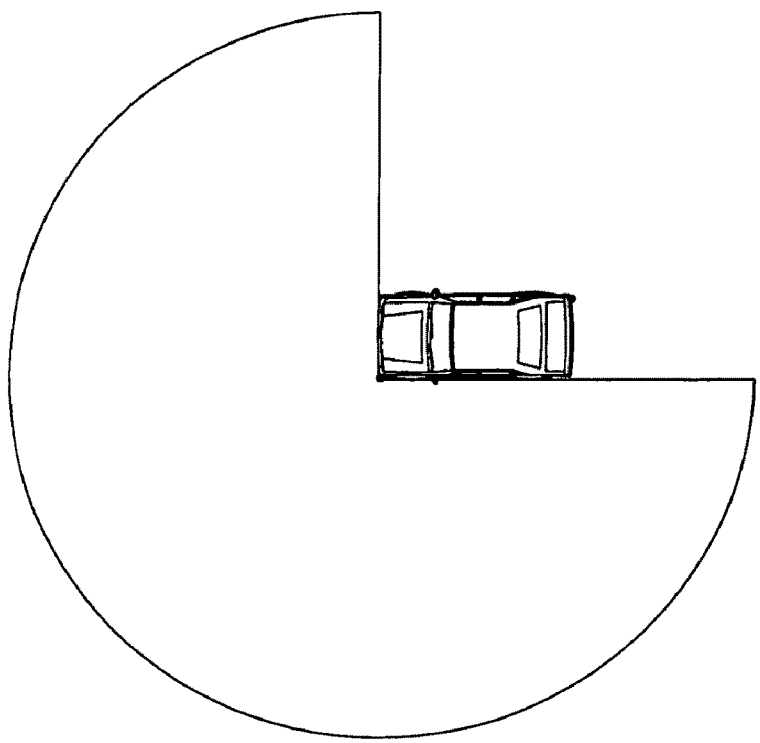
*Fig.3A(1)*

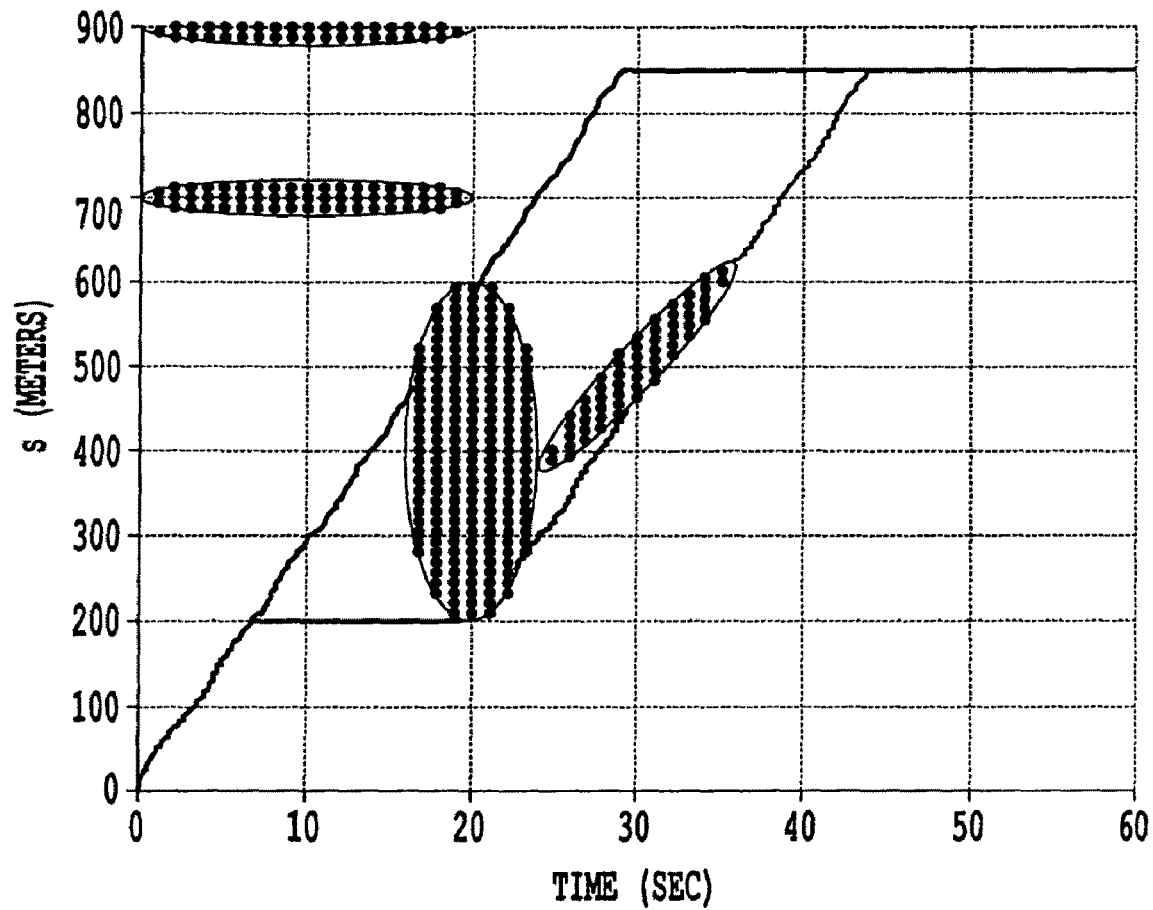
*Fig.6*B

CONTROL AND SYSTEMS FOR AUTONOMOUSLY DRIVEN VEHICLES

CROSS REFERENCE TO RELATED APPLICATIONS

This application is related to U.S. Ser. No. 11/376,160, entitled "NAVIGATION AND CONTROL SYSTEM FOR AUTONOMOUS VEHICLES" filed Mar. 16, 2006. The entire contents of this application are incorporated herein by reference.

DISCUSSION OF THE BACKGROUND

1. Field of the Invention

The invention relates to an integrated sensor and computer-based algorithm system which controls and directs autonomously driven vehicles.

2. Background of the Invention

In a modern vehicle, the driver remains a critical component of the vehicle's control system as the driver makes numerous decisions directed to the safe operation of the vehicle including speed, steering, obstacle and hazard recognition, and avoidance thereof. Yet, the driver's ability to perform all of these functions can become compromised due to physical factors such as driver fatigue, driver impairment, driver inattention, or other factors such as visibility that reduce the reaction time needed by the driver to successfully avoid hazards.

Furthermore, in environmentally dangerous surroundings such as for example in warfare settings or in settings where toxic or nuclear radiation hazards are present, the driver is at risk. Indeed, roadside bombs in Iraq are just one contemporary example of the loss of human life which could in many situations be avoided if supply trucks bringing materials to the troops were unmanned.

In other more conventional environments, the driver may become disoriented or incapable of physically commanding the vehicle as would occur if the driver suffered a medical emergency or if for example the driver became disoriented under the driving conditions. One example of such a disorienting or incapacitating environment would be a car or ship being driven or steered under snow, fog, rain, and/or nighttime blackout conditions where the diver (or captain of the ship) is handicapped in his or her ability to perceive and react to hazards approaching or to which the ship is approaching.

Thus, whether addressing human deficiencies in the control of a vehicle or whether in environmentally hazardous conditions where human control is not preferred, there exists a need to have a system and method for vehicular identification of stationary and moving objects in the path or coming into the path of the vehicle.

Numerous articles on the development of autonomously driven vehicles and laser detection and visualization systems have been reported such as the following reference articles all of which are incorporated herein by reference:

1) H. Wang, J. Kearney, J. Cremer, and P. Willemsen, "Steering Autonomous Driving Agents Through Intersections in Virtual Urban Environments," 2004 International Conference on Modeling, Simulation, and Visualization Methods, (2004);
2) R. Frezza, G. Picci, and S. Soatto, "A Lagrangian Formulation of Nonholonomic Path Following," The Confluence of Vision and Control, (A. S. Morse et al. (eds), Springer Verlag, 1998);
3) J. Shirazi, Java Performance Tuning, (OReilly & Associates, 2000);
4) J. Witt, C. Crane III, and D. Armstrong, "Autonomous Ground Vehicle Path Tracking," Journal of Robotic Systems, (21(8), 2004);
5) C. Crane III, D. Armstrong Jr., M. Torrie, and S. Gray, "Autonomous Ground Vehicle Technologies Applied to the DARPA Grand Challenge," International Conference on Control, Automation, and Systems, (2004);
6) T. Berglund, H. Jonsson, and I. Soderkvist, "An Obstacle-Avoiding Minimum Variation B-spline Problem," International Conference on Geometric Modeling and Graphics, (July, 2003);
7) D. Coombs, B. Yoshimi, T. Tsai, and E. Kent, "Visualizing Terrain and Navigation Data," NISTIR 6720, (Mar. 1, 2001);
8) U.S. Pat. No. 5,644,386 to Jenkins et al;
9) U.S. Pat. No. 5,870,181 to Andressen;
10) U.S. Pat. No. 5,200,606 to Krasutsky et al; and
11) U.S. Pat. No. 6,844,924 to Ruff et al;

Despite this work, realization of suitable visualization, obstacle identification, and obstacle avoidance systems and methods has not been without problems limiting the operation of vehicles, especially with regard to autonomous direction in an urban setting.

SUMMARY OF THE INVENTION

In one embodiment of the invention, a navigation and control system includes one or more position sensors configured to generate position signals indicative of the location and heading of a vehicle. The system includes one or more operation control mechanisms having inputs and producing outputs which control an operation of the vehicle and includes a self-contained autonomous controller disposed remote from the operation control mechanisms. The autonomous controller includes a processor configured to receive the position signals from the position sensors and to generate operation control signals defining an updated travel path for the vehicle, and a programmable interface providing communication among the position sensors, the operation control mechanisms, and the processor. The programmable interface is configured to normalize inputs to the processor from the position sensors and to generate compatible operation control signals applied as the inputs to the operation control mechanisms, whereby the self-contained autonomous controller is configurable for operation with a variety of different sensors and different operation control mechanisms.

In one embodiment of the invention, a method for navigation and control of a vehicle includes generating position signals indicative of the location and heading of a vehicle, normalizing the position signals by way of a programmable interface to produce normalized position signals, producing from the normalized position signals operation control signals, and normalizing the operation control signals by way of the programmable interface to produce normalized operation control signals which control an operation of the vehicle along an updated travel path for the vehicle.

It is to be understood that both the foregoing general description of the invention and the following detailed description are exemplary, but are not restrictive of the invention.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings, wherein:

FIG. 1A is a schematic illustration of an autonomous vehicle according to one embodiment of the invention in which a two-dimensional (2D) scan is made in a sector of a plane normal to a predetermined axis of a vehicle;

FIG. 3A(1) is a schematic depiction of one area scanned by one laser scanner system in one embodiment of the invention;

FIG. 3A(2) is a schematic depiction of a complementary area scanned by another laser scanner system in one embodiment of the invention;

FIG. 6B is an exemplary S-T diagram which shows the original speed plan and the corrected path taking into account observed obstacles;

DETAILED DESCRIPTION OF THE PREFERRED EMBODIMENTS

Figure 1B:
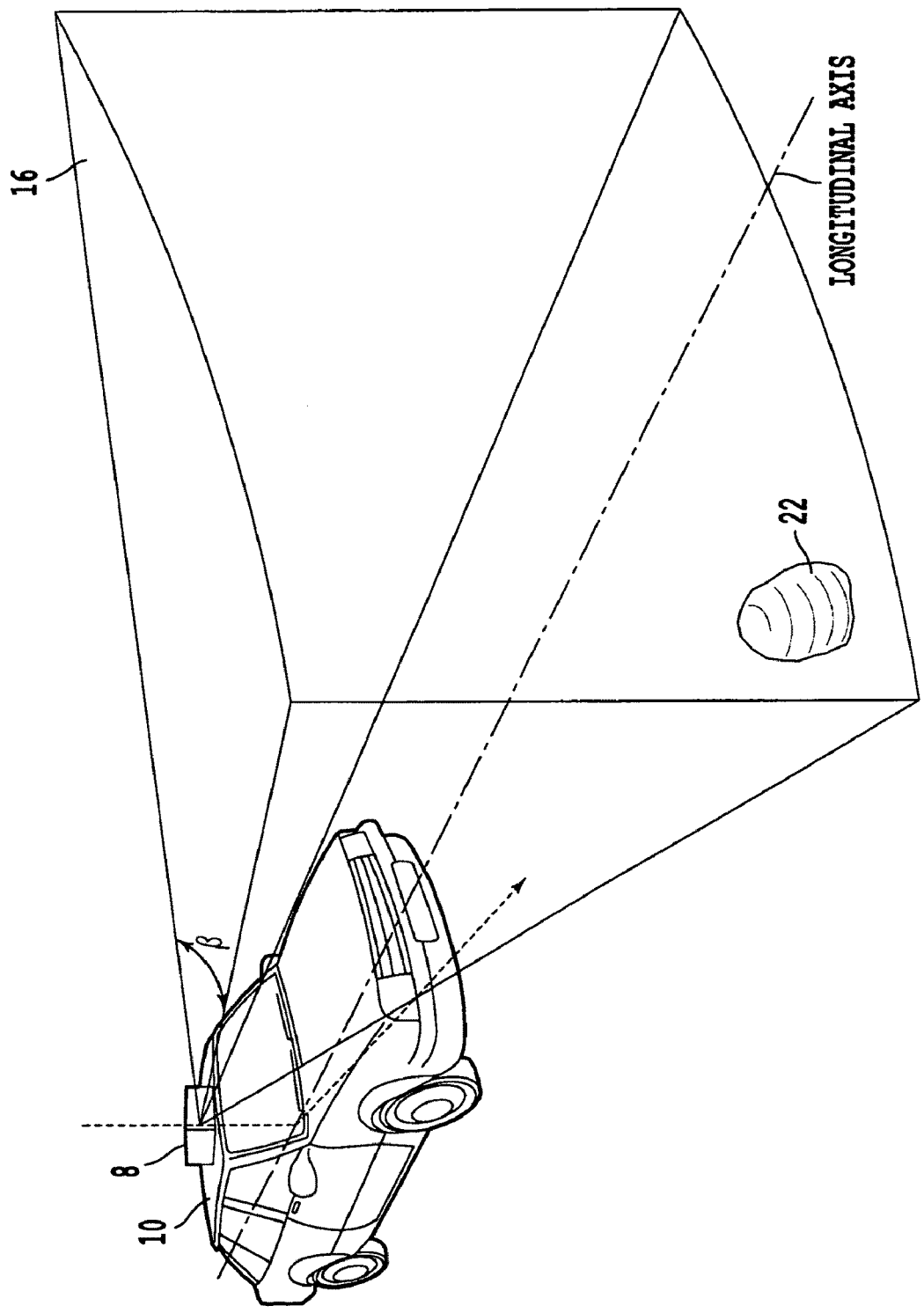
FIG. 1B is a schematic illustration of an autonomous vehicle according to one embodiment of the invention in which a three-dimensional (3D) scan is made by displacing the scan out the plane normal to the predetermined axis of a vehicle.

Referring now to the drawings, wherein like reference numerals designate identical, or corresponding parts throughout the several views, and more particularly to FIG. 1A, which depicts an imaging sensor 8 mounted, in one embodiment, on top of a vehicle 10 in which a two-dimensional (2D) scan is made in a sector of a plane 11 normal to a predetermined axis of the vehicle 10 referred to here for illustration purposes as a "vertical" scanning plane. This imaging sensor and its operation are described in more detail in U.S. Ser. No. 11/376,160. This imaging sensor is but one example an imaging sensor that can be used in the invention.

Figure 2:
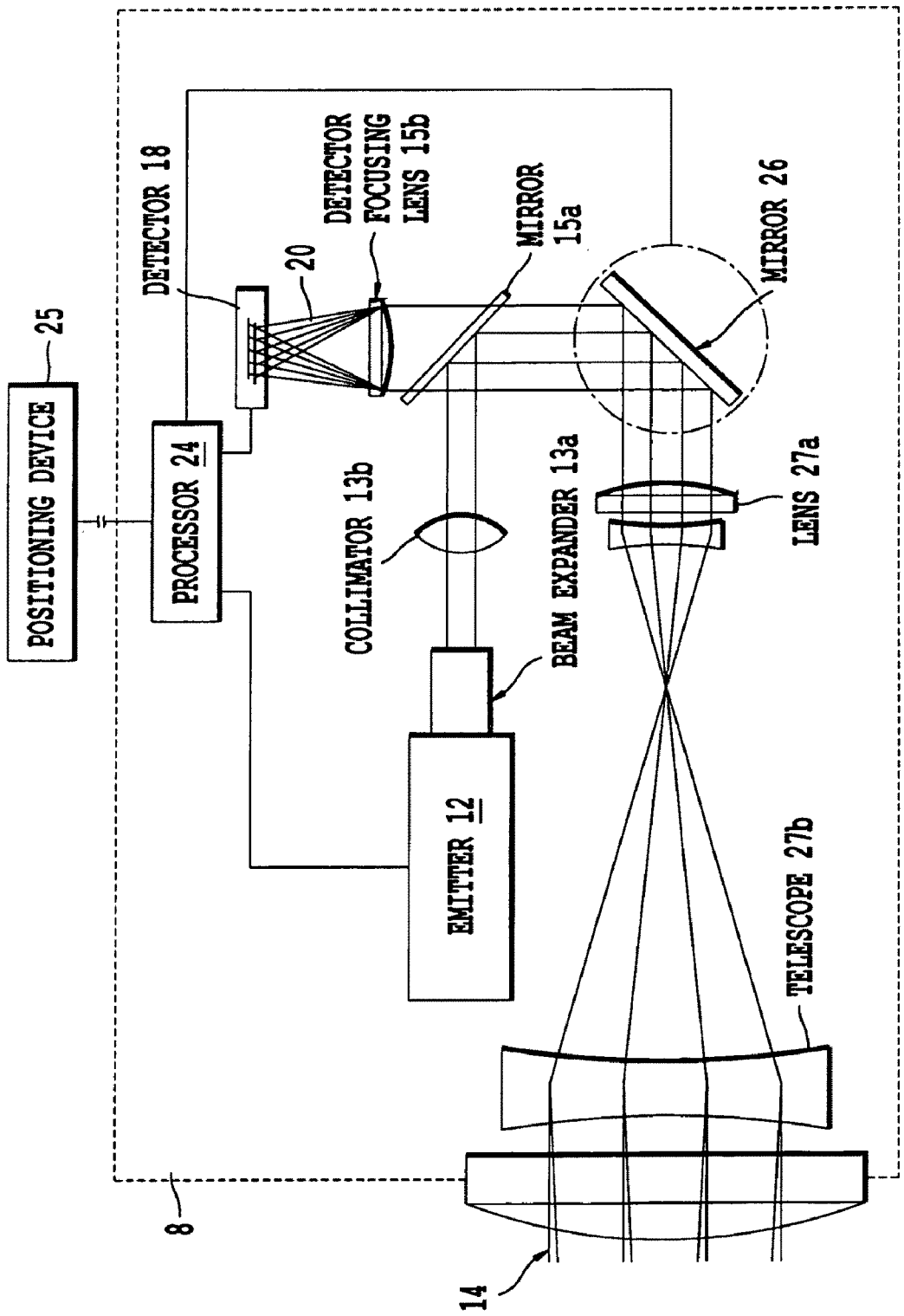
FIG. 2 is a schematic illustration of an emitter and detector system according to one embodiment of the invention.

Nevertheless, the description here outlines briefly the operation of imaging sensor 8 in order to provide one context for application of the invention. The imaging sensor 8 includes in one embodiment an emitter 12 (as shown in FIG. 2) that transmits laser pulses (or light) 14 from the imaging sensor 8 into the environment about the vehicle 10. As shown in FIG. 1A, the laser (or light) pulses 14 are emitted into the vertical scanning plane 11. To produce a three-dimensional (3D) image, the imaging sensor 8 is panned (or oscillated) in and out of plane 11 to create a 3D scanning volume 16, as shown in FIG. 1B. The imaging sensor 8 detects objects 22 (as shown in FIG. 1B) in the environment nearby the vehicle 10 by detecting light reflected from the objects 22.

In one embodiment of the invention, the autonomous vehicle 10 uses two laser scanner systems 40 which are described in more detail below.

As shown in FIG. 2, the imaging sensor 8 includes a detector 18 for detecting return of an echoed signal 20. The imaging sensor 8 utilizes a processor 24 for controlling the timing and emission of the laser pulses 14 and for correlating emission of the laser pulses 14 with reception of the echoed signal 20. The processor 24 may be on-board the vehicle or a part of the imaging sensor 8. Details of exemplary processors and their functions are provided later.

In an exemplary example, laser pulses 14 from emitter 12 pass through a beam expander 13*a* and a collimator 13*b*. The laser pulses 14 are reflected at a stationary mirror 15*a* to a rotating mirror 26 and then forwarded through lens 27*a* and a telescope 27*b* to form a beam for the laser pulses 14 with a diameter of 1-10 mm, providing a corresponding resolution for the synthesized three-dimensional field of view. The telescope 27*b* serves to collect light reflected from objects 22.

In one embodiment of the invention, the detector 18 is configured to detect light only of a wavelength of the emitted light in order to discriminate the laser light reflected from the object back to the detector from background light. Accordingly, the imaging sensor 8 operates, in one embodiment of the invention, by sending out a laser pulse 14 that is reflected by an object 22 and measured by the detector 18 provided the object is within range of the sensitivity of the detector 18. The elapsed time between emission and reception of the laser pulse permits the processor 24 is used to calculate the distance between the object 22 and the detector 18. In one embodiment of the invention, the optics (i.e., 13*a*, 13*b*, 15*a*, 26, 27*a*, and 27*b*) are configured to direct the beam instantaneously into the sector shown in FIG. 1A, and the detector 18 is a field-programmable gate array for reception of the received signals at predetermined angular positions corresponding to a respective angular direction $\alpha_1$ shown in FIG. 1A.

Via the rotating mirror 26, laser pulses 14 are swept through a radial sector $\alpha$ within plane 11, as shown illustratively in FIG. 1A. In one embodiment of the invention, in order to accomplish mapping of objects in the field of view in front of the imaging sensor 8, the rotating mirror 26 is rotated across an angular displacement ranging from 30 to 90 degrees, at angular speeds ranging from 100-10000 degrees per second.

To produce a three-dimensional (3D) image, in one embodiment of the invention, the imaging sensor 8 is panned (or oscillated) in and out the plane 11 to create a 3D scanning volume 16, as shown in FIG. 1B. For sake of illustration, FIG. 1B defines the scanning volume 16 by the angle α (in the vertical scanning direction) and the angle β (in the horizontal scanning direction). The angle α, as noted earlier, ranges from 30 to 70 degrees, at angular speeds ranging from 100-1000 degrees per second. The angle β (i.e., the panning angle) ranges from 1 to 270 degrees, at a panning rate ranging from 1-150 degrees per second. Combined the imaging sensor 8 typically can completely scan the 3D scanning volume 16 at more than two times a second.

In one embodiment of the invention, geospatial positional data of the instantaneous vehicle position is utilized by processor 24 to calculate based on the distance of the object from the vehicle and its direction from the vehicle, the geospatial location of the objects in the field of view. As shown in FIG. 2, processor 24 is in communication with a real time positioning device 25, such as for example a global positioning system (GPS) and/or an inertial navigation system (INS), that transmits the location, heading, altitude, and speed of the vehicle multiple times per second to processor 24. The real time positioning device 25 is typically mounted to the vehicle 10 and transmits data (such as location, heading, altitude, and speed of the vehicle) to all imaging sensors 8 (and all processors 24) on the vehicle 10.

With commercially available GPS and the INS units, processor 24 can determine a position of an object in the field of view to an accuracy of better than 10 cm. In one embodiment of the invention, the processor 24 correlates GPS position, LADAR measurements, and angle of deflection data to produce a map of obstacles in a path of the vehicle. The accuracy of the map depends on the accuracy of the data from the positioning device 25. The following are illustrative examples of the accuracies of such data: position 10 cm, forward velocity 0.07 km/hr, acceleration 0.01%, roll/pitch 0.03 degrees, heading 0.1 degrees, lateral velocity 0.2%.

In one embodiment of the invention, a Kalman filter (commercially integrated) sorts through all data inputs to processor 24. A Kalman filter is a known method of estimating the state of a system based upon recursive measurement of noisy data. In this instance, the Kalman filter is able to much more accurately estimate vehicle position by taking into account the type of noise inherent in each type of sensor and then constructing an optimal estimate of the actual position. Such filtering is described by A. Kelly, in "A 3d State Space Formulation of a Navigation Kalman Filter for Autonomous Vehicles," CMU Robotics Institute, Tech. Rep., 1994, the entire contents of which are incorporated herein by reference.

Commercially available components can be used for the emitter 12 and the detector 18 to provide ranging measurements. In one embodiment, the emitter 12, the detector 18, and the associated optics constitute a laser radar (LADAR) system, but other systems capable of making precise distance measurements can be used in the invention, such as for example a light detection and ranging (LIDAR) sensor, a radar, or a camera. LIDAR (Light Detection and Ranging; or Laser Imaging Detection and Ranging) is a technology that determines distance to an object or surface using laser pulses.

FIG. 3A(1) is a schematic depiction of one area scanned by one laser scanner system in one embodiment of the invention. FIG. 3A(2) is a schematic depiction of a complementary area scanned by another laser scanner system in one embodiment of the invention Each of the laser scanner systems 40 use four lasers in conjunction with a rotating mirror to emit laser pulses 14 so as to sweep for example a 270° arc in front of the sensor. The invention is not limited to sweeping exactly a 270° arc, and other arc ranges from 180° to 270° to 360° could be used. In this example, the beams emanate from the unit on 4 different scanning planes which are offset by 0.8° when a mirror is pointed directly ahead and 0° directly to the sides. By using multiple lasers in this manner, the scanner systems 40 are capable of maintaining a sufficient field of view even as the vehicle pitches and rolls during maneuvers.

The scanner systems 40 can be mounted at different heights from the ground. For example, by mounting a sensor at the relatively low height of 0.5 of a meter, the sensor can detect smaller obstacles more effectively than if it were mounted higher up on the vehicle. On the other hand, some horizontally mounted sensors are not as effective when mounted low because their scanning plane is frequently obstructed by the ground when the vehicle is pitching.

Figure 3B:
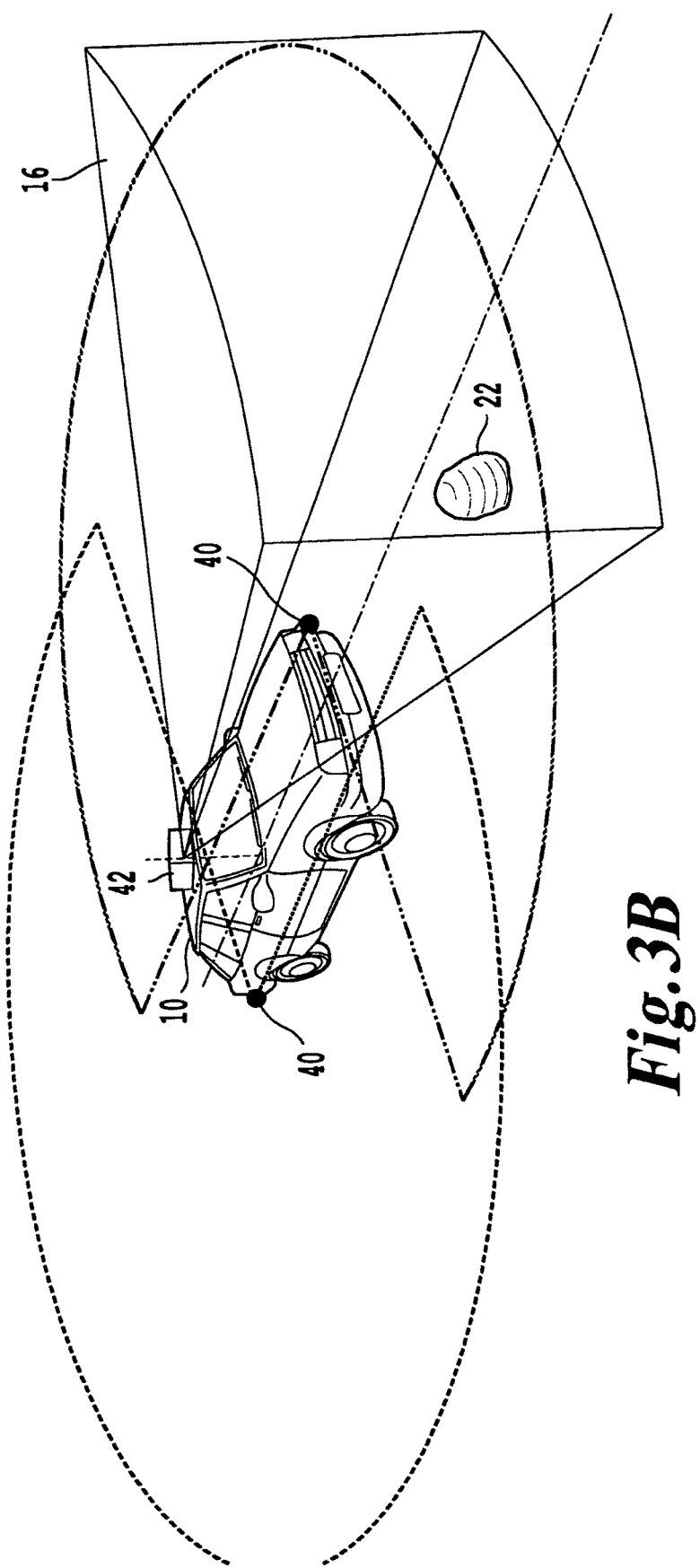
FIG. 3B is a schematic illustration of an autonomous vehicle according to one embodiment of the invention which includes a scanning system as well as an optical imaging system.

Conventionally, vehicles that needed a full 360° scanner coverage used one scanner system in the front of the vehicle and one standalone scanner in the rear of the vehicle. This approach using two ECUs (one for the front and one for the rear sensor) leaves the system vulnerable to single points of failure. The invention addresses the issue of single points of failure by using two scanners, each of which has a complete 360° field of view and thereby providing redundant views of the surrounding environment. Each scanner system has a sensor on one of the front corners of the vehicle and a sensor on the opposite rear corner of the vehicle, as illustrated in FIGS. 3A(1) and 3A(2), along with its own ECU. Indeed, FIG. 3B is a schematic illustration of an autonomous vehicle according to one embodiment of the invention which includes a scanning system (such as for example two laser scanner systems 40) as well as an optical imaging system 42.

Several significant technical challenges are presented to an autonomous vehicle which operates in an urban setting. These challenges are addressed through the innovative hardware and software design of the invention. 1) GPS data will be frequently unavailable due to the buildings and other obstructions that exist in an urban environment. Since many of the elements of the autonomous vehicle's mission are specified via GPS coordinates, additional localization information can be used to supplement the GPS data in the invention. 2) Along with static obstacles, many moving vehicles are present in an urban environment. In one embodiment of the invention, the vehicle's software tracks, interacts with, and at times predicts the movements of other vehicles. 3) Autonomous vehicles must obey all applicable traffic laws at all times. 4) The autonomous vehicle in an urban environment at times performs advanced maneuvers, such as passing other vehicles, parking, performing a U-turn, performing a left turn through a lane of oncoming traffic, and navigating through heavy traffic. 5) In certain areas of an urban environment, the road will be specified with only a sparse set of waypoints, and the autonomous vehicle of the invention will utilize sensors to detect an appropriate path to follow.

These challenges are addressed in the invention by a software system which tracks the state of both the autonomous vehicle and other vehicles in the environment, particularly in intersections.

System Components

Working Vehicle: A 2005 Ford Escape Hybrid™ (hereinafter referred to as the working vehicle) was modified to include the imaging sensors 8 of the invention. The working vehicle used a hybrid drive system in which an electric engine operates virtually all of the time and in which the gas engine starts and stops automatically to either provide extra horsepower or to recharge the electric engine's battery. The working vehicle's electrical system, which was powered by a 330-volt battery, provides over 1300 watts of power to the equipment mounted in the working vehicle.

The working vehicle utilized a commercially available Advanced Electronic Vehicle Interface Technology (AEVIT) "drive-by-wire" system from Electronic Mobility Controls (EMC) to physically control the car. The AEVIT system uses redundant servos and motors to turn the steering wheel, switch gears, apply throttle, and apply brake. This commercially available solution from EMC Corporation includes actuators and servos mounted on the steering column, brake pedal, throttle wire, emergency brake, and automatic transmission. It is also able to control the vehicle's turn signals and ignition. By using electronic driving aid control systems, all aspects of the vehicle are controlled via one fully integrated system, reducing overall complexity and eliminating points of failure. The electronic driving aid control systems also provided an emergency-stop (E-Stop) mechanism for the autonomous vehicle which, when triggered, applies the vehicle's primary braking system, and then turns off the vehicle's ignition. Finally, after a slight delay, the vehicle's emergency brake is applied and held. This ensures that the vehicle can stop effectively when an E-Stop command is received and be able to remain stopped even if the vehicle is on an incline. These capabilities are considered optional in the invention.

Hardware platform: An Autonomous Vehicle System (AVS) platform of the invention has been designed for a variety of autonomous driving applications. The AVS platform includes a hardware layer and a software layer. The hardware layer includes printed circuit boards or other self-contained wiring and device constructs which contain the wiring to both provide power to and communicate with external sensors such as GPS receivers or obstacle sensors as well as operation control mechanisms having inputs and producing outputs which control an operation of the vehicle. In one embodiment application-specific integrated circuits (ASIC) can be used for this purpose.

Figure 4A:
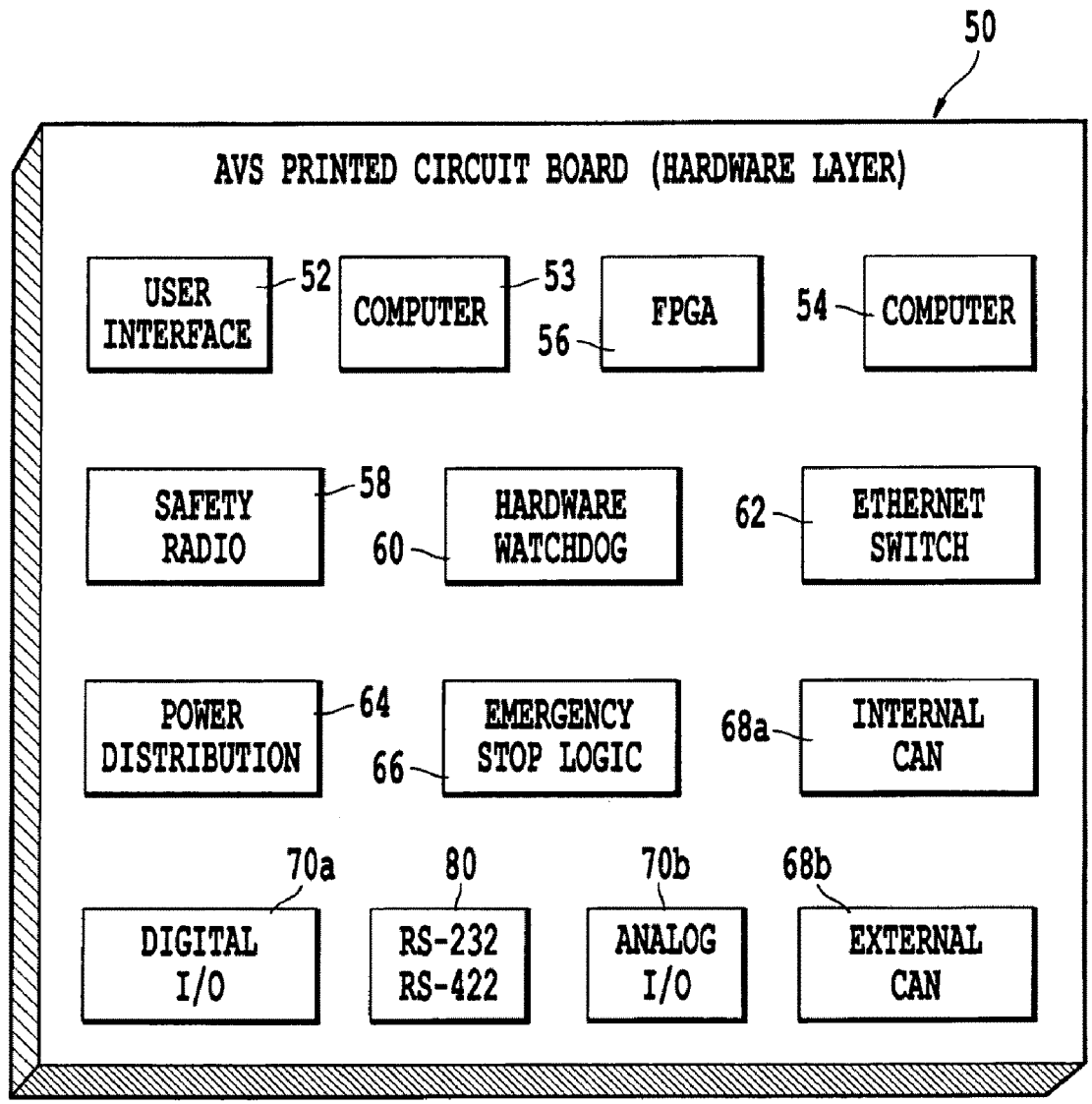
FIG. 4A is a hardware schematic showing an integrated autonomous vehicle system platform of the invention.

FIG. 4A is a hardware schematic showing an integrated autonomous vehicle system platform of the invention. FIG. 4A depicts specifically an AVS printed circuit board 50 including a user or program interface 52, computers 53, 54, a field programmable gate array device 56, a safety radio 58, a hardware watchdog 60, an Ethernet link device 62, a power distribution component 64, an emergency stop (E-stop) logic device 66, internal and external controller area networks (CAN) 68, digital and analogue input/output devices 70, and RS-232 and RS-422 ports 80. By integrating these components onto a printed circuit board, an autonomous vehicle system (AVS) platform provides the hardware for integration of a wide variety of sensors with the computing capability to process the sensor data and direct the autonomous vehicle. Moreover, by implementing the majority of the physical wiring on printed circuit boards rather than wiring by hand, the hardware layer in the AVS platform of the invention has showed increased reliability.

Furthermore, prior to the invention, autonomous vehicles have been specifically designed or retrofitted for specific sensors and drive and steering controls. These mostly prototype vehicles were used to address specific issues in the development of autonomous vehicles as the industry developed these vehicles with a goal many times of specific solutions to known problems which the autonomous engineer was aware of. Accordingly, there was no real impetus at that time to produce a more universal autonomous vehicle control platform. Further, the unsettled questions of which kinds of sensors and which kinds of driving control systems were to be incorporated left the design of a system which could capability match the myriad of choices for sensing and controlling autonomous vehicles in a state where the filed was too premature to consider such a universal solution.

Accordingly, in one embodiment of the invention, the user or program interface 52 by which a user can program the configurable interface device for specific sensors and specific drive steering controls. For example, an engineer installing the AVS printed circuit board 50 in an autonomous vehicle will program the field programmable gate array device 56 (i.e., a configurable interface device) for a specific sensor suite on the autonomous vehicle and program for a specific driving and steering controls such as for example controls needed for an AEVIT drive-by-wire system (i.e., an operation control mechanism). In another example, a field or service technician may install a new sensor on an autonomous vehicle, and at that time re-program the field programmable gate array device 56 to be compatible with the newly installed sensor.

The printed circuit board 50 in one embodiment was interfaced with E-Stop radios for the safety radios 58 and with an AEVIT drive-by-wire system (constituting one of the computers depicted on FIG. 4A). The hardware layer in one embodiment includes a programmable logic device (i.e., the hardware watchdog 60) that monitors the operation of the hardware and is capable of power-cycling failed components (through for example the power distribution component 64) or even stopping the vehicle (through for example the E-stop logic device 60) should a fatal error be detected. In one embodiment, the AVS hardware layer includes for the computers 53, 54 Intel Core Duo computers running the QNX hard real-time operating system. These computers were used to run the AVS software platform.

Figure 4B:
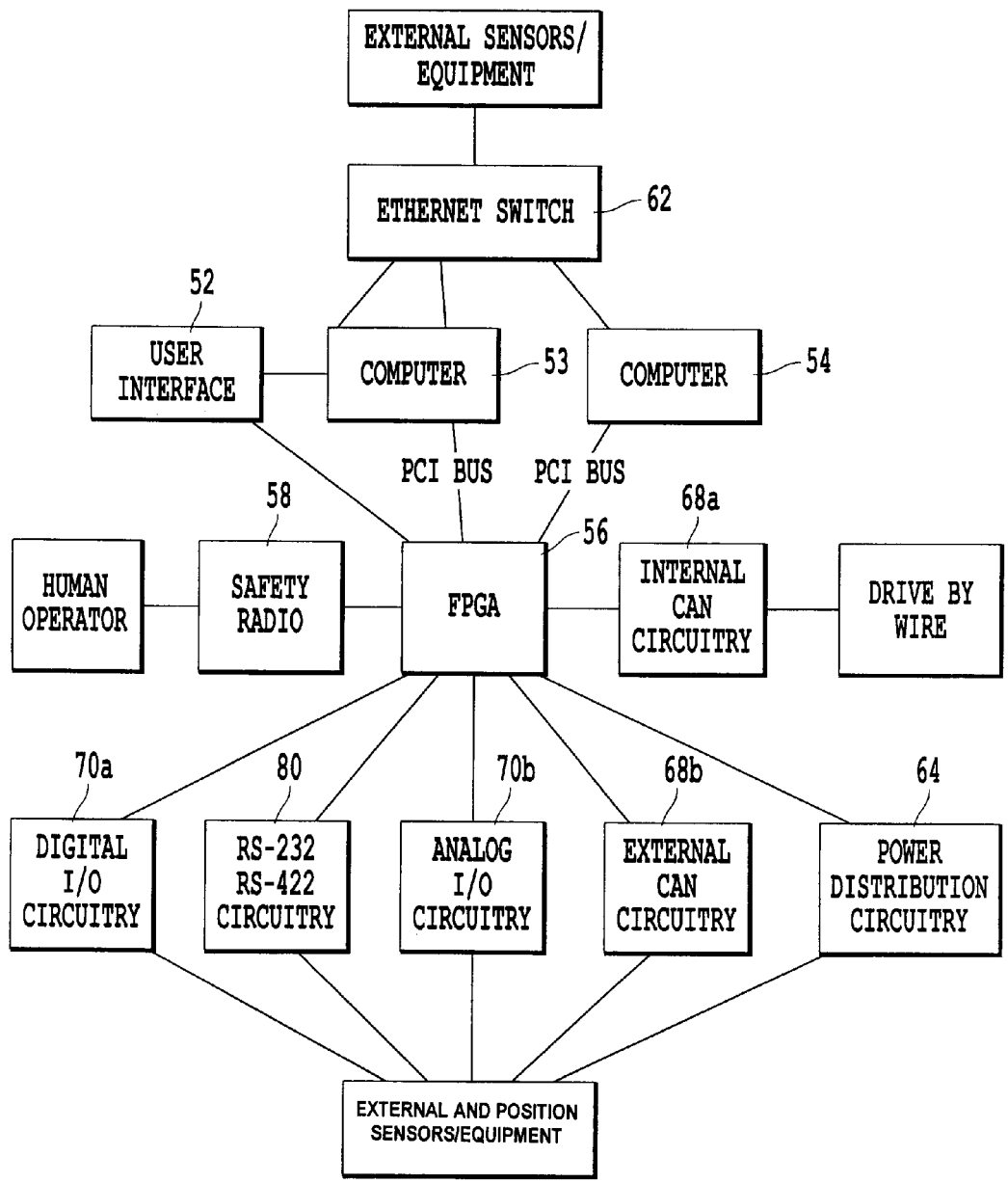
FIG. 4B is a functional schematic showing the interconnections of multiple processors controlling the autonomous vehicle of the invention.

Intra-system Communications: FIG. 4B is a functional schematic showing the process relationship between the controller area networks (CAN) and the AVS software/hardware and the sensors. Communication within the individual components of the AVS platform can be segmented based upon the criticality and punctuality of the contained message. In one embodiment, vehicle control messages between the AVS software and the drive by wire system can be transmitted over an independent Controller Area Network (CAN). CAN 68 in one embodiment has an integrated priority system, which provides predictable real-time communications (e.g, driving and control signals) and which provides robustness against electromagnetic interference. In one priority control system of the invention, an emergency control and, if necessary, the stopping of the vehicle take the highest priority and supersedes any other communication on the CAN bus. Barring the infrequent presence of emergency messages, the control communications between the planning software and the drive by wire system are able to occur unhindered for predetermined amounts of time, as a second priority.

In one embodiment, on printed circuit board 50, a separate CAN bus is used for communication with sensors (e.g, sensor signals) designed specifically for automotive use, which may or not be capable of other forms of communication. By dedicating a control network to the sensors, control packets are prevented from preempting input sensor packets. Additionally, this separation helps prevent a malfunctioning device on the sensor network from disrupting the control CAN bus, as such a disruption could compromise the safe operation of the autonomous vehicle.

In one embodiment, on printed circuit board 50, higher bandwidth communication between the sensors and the planning computers 53, 54 occurs over the Ethernet link device 62. High precision sensors coupled to the AVS platform can generate large amounts of data that are well suited to the high bandwidth, low latency, and fault tolerance offered by Ethernet link device 62. In one embodiment, both position data from the localization sensor and object data from the obstacles scanners contain timestamps that negate the need for deterministic transmission of their data. The position and obstacle data can be reconstructed and reordered within the trip planning computers 53, 54 to rebuild any one of the sensors' view of the world.

In one embodiment, on printed circuit board 50, a field programmable gate array device 56 collects position and movement information, and can compensate for drift in the inertial system and outages in the GPS system before the data is transmitted to computers 53, 54. The corrected data is then sent via Ethernet and CAN to the computers 53, 54. The corrected data is also transmitted via a dedicated CAN bus to the obstacle scanners. This data is sent to the obstacle scanners so that the vehicle's position, speed, and orientation can be used to potentially help correct the scanner's obstacle data. The computers 53, 54 are then able to correlate obstacles, the robot's location, and mission waypoints to the same coordinate set. The field programmable gate array device 56 can provide communication among the position sensors, the operation control mechanisms, and the processor, and can 1) normalize inputs to the processor from the position or object sensors and 2) generate compatible operation control signals applied as the inputs to the operation control mechanisms (such as for example the Advanced Electronic Vehicle Interface Technology (AEVIT) discussed above). In this way, the printed circuit board 50 (i.e., a self-contained autonomous controller) is configurable for operation with a variety of different sensors and different operation control mechanisms.

Accordingly, the integrated printed circuit platform embodiment provides unique capabilities for the autonomous vehicle of the invention through a novel configuration which includes a processor configured to receive input from sensors on-board the autonomous vehicle, identify a travel path from one destination to another, identify stationary and moving obstacles and waypoints along the travel path, and correct the travel path to avoid both the stationary and moving obstacles. The integrated printed circuit platform includes at a functionally central location a programmable device which provides the capability to accept and normalize both inputs from the autonomous vehicle sensors and outputs to the drive and steering controls. The platform thus provides the capability to accommodate a wide variety of autonomous vehicle sensors by 1) including a variety of input/output devices on the printed circuit board and 2) providing an interface through which a user can "customize" the platform for the specific set of sensors and steering controls.

Figure 4C:
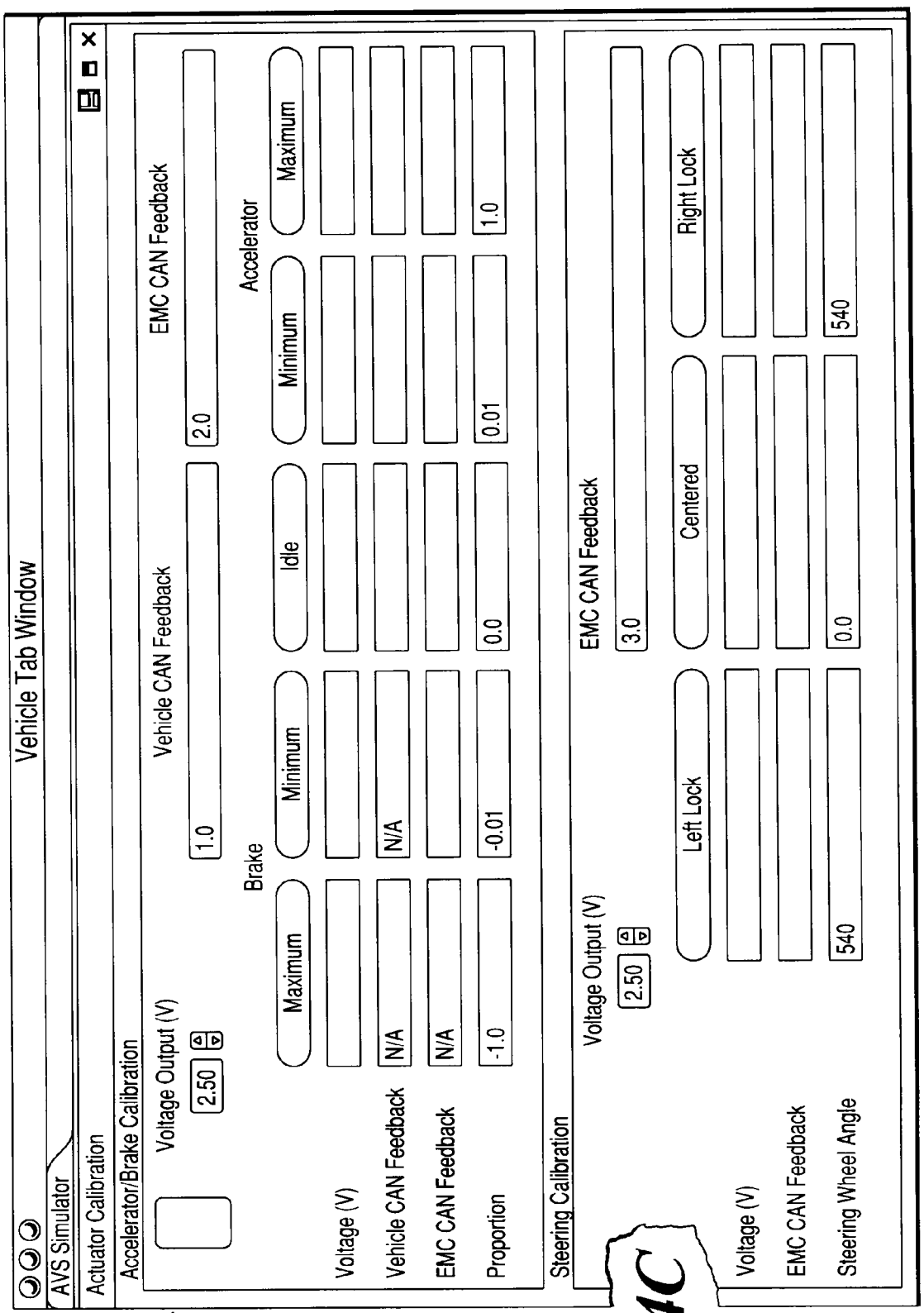
FIG. 4C is a screen shot of a Graphical Display provided to a user for configuration of the autonomous vehicle system platform.

As noted above, user or program interface 52 provides a user a mechanism by which the FPGA 56 can be programmed to accommodate the various sensors and driving and steering controls which are included on the autonomous vehicle. FIG. 4C is a screen shot of a Graphical Display 70 provided to the user upon accessing the user interface. Graphical Display 70 includes controls which permit a user to select fields such as for example the voltage (V), vehicle CAN feedback, EMC CAN feedback, and proportion gain controls. As shown in FIG. 4B, the user or program interface 52 permits one to configure the autonomous vehicle system platform through either interaction with one (or both) computers 53 or 54 or through either interaction directly with the field programmable gate array device 56.

Sensors: An autonomous vehicle needs an accurate picture of the surrounding environment and its own global position in order to navigate safely in any environment. There are added challenges for operating in an urban environment. The following describes the different types of sensors installed on the autonomous vehicle of the invention, in various embodiments of the invention.

Location or Position Sensors: One of the challenges for an autonomous vehicle or a robot entering an urban setting lies in building a map of the world around the robot and locating itself within that map. The data collected from the obstacle and lane detection sensors are referenced to some absolute location in the world or some location relative to the vehicle. Without accurate information about the location, heading, and velocity of the vehicle, other data can become useless. Planning a route within the world and in conjunction with traffic is simplified by translating all information gathered about the vehicle to a set of global coordinates. Doing this translation requires exact knowledge of the location of the vehicle when the data were collected. From this information, a map of the area surrounding the autonomous vehicle can be created, and from this map the path of the autonomous vehicle can be planned.

Fundamentally, planning the path of the autonomous vehicle and synthesizing the data collected from the sensors requires precise localization information. The working vehicle described above utilized RT3000™ positioning devices from Oxford Technical Solutions to provide vehicle localization (i.e., positioning data). The RT3000™ uses Omnistar™ HP differential GPS signals to provide position accuracy of 10 centimeters or less and to provide heading measurements accurate to within 0.1 of a degree. An integrated inertial navigational system (INS) in the RT3000™ permits the RT3000™ to survive GPS outages of up to 30 seconds with virtually no performance degradation. The INS provides acceleration and roll information. In addition to the accelerometers and gyroscopes within the inertial system, wheel speed input from one of the Ford Escape Hybrid's rear ABS wheel speed sensors via an anti-braking system (ABS) Interface board is provided to the RT3000 sensor. The AVS interface board reads the communication signals from the Ford Escape's ABS sensors to the Ford Escape's ECU, and converts it to signals that the GPS can use. The RT3000 sensor internally integrates the data from each source using a combination of Kalman filtering and algorithms provided internally to the RT300 sensor.

Figure 5A:
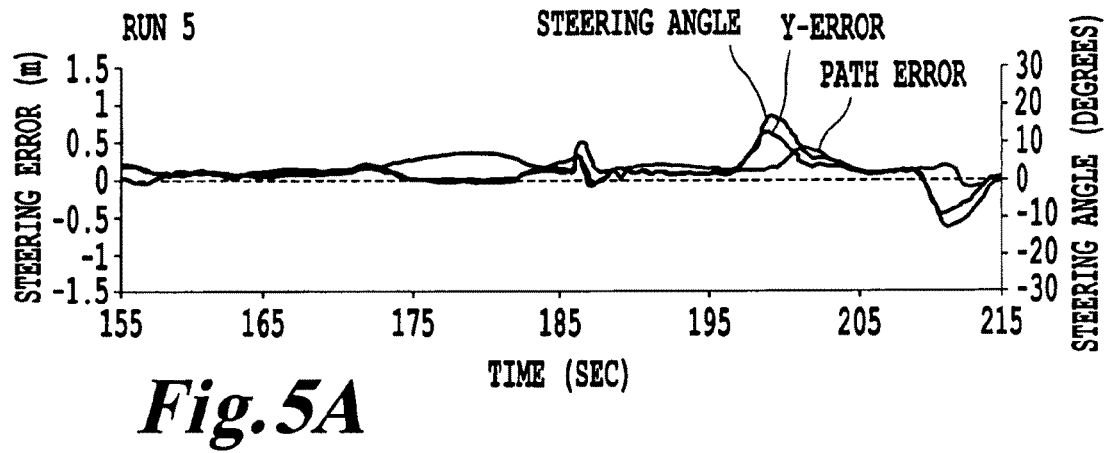
FIGS. 5A-5C are depictions of data gathered from a steering controller during operation of an autonomous vehicle of the invention when travelling through a tunnel, in which GPS signal was completely lost.
Figure 5B:
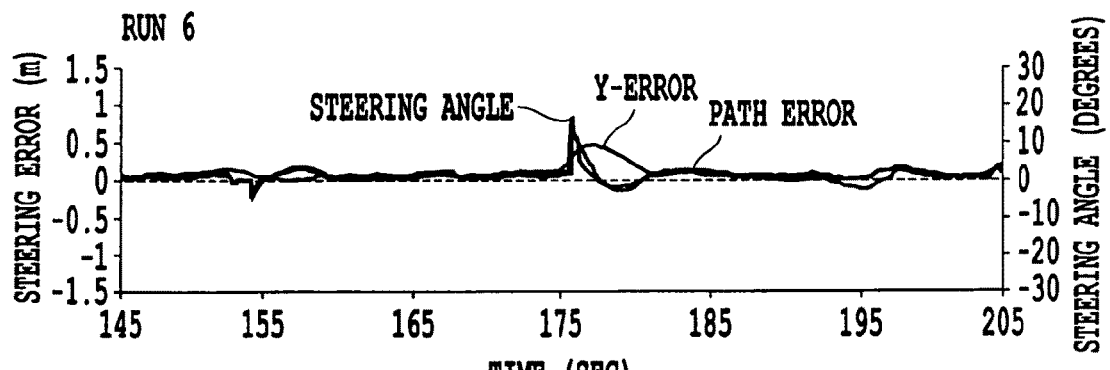
Figure 5C:
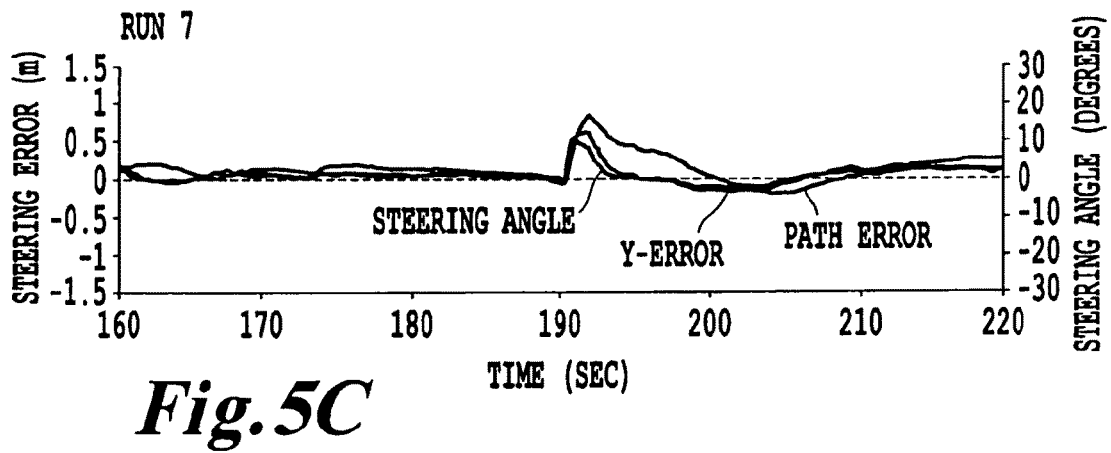

The RT3000 sensor is used in the invention as one example of an effective localization sensor. Even in instances when the GPS signal becomes partially or completely lost, the RT3000 sensor can compensate for the lost signal properly. FIGS. 5A-5C shows data gathered from the steering controller during an autonomous vehicle travel through a tunnel, in which GPS signal was completely lost for between 10 and 15 seconds. The fact that the vehicle was only 50 centimeters off of the desired path upon reacquisition of GPS signal speaks both to the reliability of the RT3000 sensor and to the ability of the control systems to work well in conjunction with data emanating from the RT300 sensor. In these figures, Y-Error is the input signal to the control system algorithms, path error is the actual amount by which the vehicle centerline is off of the desired path, and steering angle is the angle of the vehicle's front tires. As the Y-Error signal increases, the steering angle will be adjusted to attempt to minimize the actual path error.

Obstacle or Object Sensors: In one embodiment as discussed in general above, the autonomous vehicle of the invention uses two Ibeo ALASCA XT fusion system sensors (Ibeo Automobile Sensor GmbH, Merkurring 20, 22143 Hamburg, Deutschland) for its primary obstacle avoidance sensors. Each ALASCA XT fusion system sensor includes two Ibeo ALASCA XT laser scanners and one Ibeo Electronic Control Unit (ECU). Each ALASCA XT laser scanner in the working vehicle used four eye-safe lasers in conjunction with a rotating mirror to sweep a 270° arc in front of the sensor. All four beams in the ALASCA XT laser scanner emanate from the unit on 4 different scanning planes which are offset by 0.8° when the mirror is pointed directly ahead and 0° directly to the sides.

Because of the flexibility of its field of view, the ALASCA XT laser scanners in this demonstration were rigidly mounted to the vehicle at a height of approximately 0.5 of a meter from the ground. Other height positions are suitable for the invention. By mounting the sensor at the relatively low height of 0.5 of a meter, the sensor can detect smaller obstacles more effectively than if the sensor were mounted higher up on the vehicle. Some horizontally mounted sensors are not as effective when mounted this low because their scanning plane is frequently obstructed by the ground when the vehicle is pitching.

The ALASCA XT laser scanners can operate in a wide range of weather conditions due to its ability to detect multiple echoes from a single laser beam. If the beam reaches a transparent object, such as a pane of glass or a raindrop, it will create a partial echo that is recognized and qualified as such by the laser scanner. This Multi-Target Capability allows the ALASCA XT laser scanners to operate in many different types of inclement weather, including rainstorms.

Another advantage of ALASCA XT laser scanners is the electronic control unit's (ECU) ability to incorporate the laser angle and ranging information from two ALASCA XT sensors to create a map of the objects surrounding the vehicle. After filtering to remove the uninteresting laser echoes, such as raindrops and the ground, the ALASCA XT laser scanners control system combines the data from both laser scanners and then fits a polygon around groups of echoes. Next, the software algorithms in the ECU calculate each obstacle's velocity vector and identify each obstacle with its own unique identification number. To reduce communications overhead, the ECU only transmits obstacles that satisfy a specific priority classification algorithm. In one embodiment of the invention, the autonomous vehicle uses an algorithm based upon both object velocity and distance from the vehicle as the primary criteria for this classification. The resulting polygons are transmitted via CAN to the computers 53, 54. In this embodiment, since all of this processing is done locally on the ECU of the ALASCA XT laser scanner, the computers 53, 54 are spared this additional processing overhead.

The collection of obstacles returned from both obstacle detection systems 40 is incorporated into the vehicle's obstacle repository. In the event that one scanner system fails to return a list of obstacles, the vehicle seamlessly continues operation with the other scanner system without losing any of its field of view. When the failure of one scanner system is detected, the hardware layer of the AVS platform can reboot the system to see if recovery occurs upon restarting.

In another embodiment of the invention, a Velodyne LIDAR (e.g., model HDL-64E, a 64-element LIDAR sensor that delivers a 360-degree HFOV and a 26.8-degree VFOV) is used as obstacle detector 40. This LIDAR system features frame rates of 5-15 Hz and over 1.3 million data points per second. The point cloud it generates provides terrain and environment information. Both distance and intensity data are provided in the Ethernet output packet payload. The HDL-64E can even be relied on exclusively for information about the environment, and therefore provides redundancy with the other sensors described above. The HDL-64E sensor utilizes 64 lasers providing a 360 degree field of view (azimuth) with a 0.09 degree angular resolution (azimuth), at a 26.8 degree vertical field of view (elevation) with +2° up to −24.8° down with 64 equally spaced angular subdivisions (approximately 0.4°). The accuracy of the HDL-64E is less than 2 cm. The HDL-64E updates the field of view at a rate of 5 to 15 Hz (user selectable), and has a 50 meter range for pavement (~0.10 reflectivity) and a 120 meter range for cars and foliage (~0.80 reflectivity).

Lane/Road Detection Sensors: Occasionally, an autonomous vehicle must find and follow the proper lane/road in cases where only a sparse collection of waypoints identify the lane/road. To address this issue, a video-based lane-detection system e.g., model LDW from Iteris, Inc. (Iteris, Inc., Santa Ana, Calif.), was employed in one embodiment of the autonomous vehicle of the invention as imaging device 42. The Iteris LDW system uses an optical sensor and image processing system to detect and track lane markings. The imaging sensor in the LDW system creates a two dimensional digitized picture of the area ahead of the vehicle that the LDW system searches for lane markings. In the working vehicle, the imaging sensor was installed at the top of the glass windshield, although other positions looking forward would be suitable. The video-based lane-detection system provides the autonomous vehicle with the location of the left and right lane markings, the type (solid, dashed, etc.) of the left and right lane markings, the angle of the vehicle within the lane, and the curvature of the lane. This information is provided to the AVS platform software at a rate of 25 times per second via CAN 68b. The information from the video-based lane-detection system is used to build a model of the current lane that can be used by the vehicle's software systems to adjust the vehicle's planned path to better adhere to the lane model.

Software Platform: The volume and complexity of the software needed for an autonomous vehicle to operate successfully in an urban environment can easily overwhelm software architectures.

The AVS software platform was designed as a generic autonomous application framework that can be used for many different types of autonomous vehicle applications. The AVS software platform provides sensor integration functionality, obstacle avoidance functionality, navigation functionality, safety systems, event logging systems, localization functionality, real-time vehicle monitoring functionality, and network integration functionality (along with many other basic autonomous vehicle requirements.

The AVS software platform in the working vehicle used Java Programming Language, although the invention is not restricted to this programming language. Because of the platform-independence of Java, the same code base can be run on a varied number of hardware systems with reliable and repeatable results. The AVS software framework as described below uses several different software design patterns or design principles to reduce the complexity of designing autonomous vehicle applications. Each of these design patterns has been proven successful at reducing complexity and improving the reliability of software development in enterprise application development.

One of the primary software design principles used in the AVS software framework of the invention is the "Separation of Concerns" paradigm, which reduces complexity in development by breaking a large problem into a set of loosely coupled sub-problems that are designed to be easier to solve. Accordingly, the software system is separated into as many distinct components as possible with minimal amounts of overlap. By separating the software into functionally separate components, a minor failure in one component should not adversely affect other components.

The AVS software framework has been implemented using an architecture centered on an Inversion of Control (IoC) container. Inversion of Control is a design pattern where the framework operates as a container that coordinates and controls execution of the individual application components. An IoC framework simplifies application design because the framework, rather than the application, links components together and is responsible for routing events to the proper components in the application. In the AVS framework, the IoC container provides all of the services necessary for a proper real-time autonomous vehicle application, including thread scheduling, logging services, distribution of application assets across a computing cluster, fault tolerance, and network communications.

The thread scheduling capabilities of the AVS software framework significantly enhanced the development of autonomous vehicle applications. For the Separation of Concerns paradigm to be most effective, components should be as isolated as possible. Ideally, the components should be executing in parallel, rather than sequentially, so that a failure in one component does not cause the execution of subsequent components to be aborted. The AVS software framework automatically executes each component as its own thread of execution, even across multiple computers, and transparently coordinates the sharing of data between the separate components. The AVS software framework can also execute these components at set frequencies under many different levels of processor load, which is beneficial for the many control systems needed for autonomous vehicle operations, as each of these control systems requires precise timing for accurate vehicle control.

The AVS software framework in one embodiment can run on one or more core embedded computers (instead of the mere two computers 53, 54 shown in FIG. 4A). Indeed, three core embedded computers have been operated as a distributed cluster. Each computer in the cluster runs a hard real-time operating system coupled with the real-time capabilities of the AVS software framework to support deterministic execution of autonomous applications within preset time constraints. Once real-time support is enabled, the operating frequencies of the processes stabilize drastically. The real-time capabilities of the AVS software framework allow autonomous applications to behave more consistently and ensure that even in the case of software problems, higher priority components such as safety monitors and the low-level driving algorithms are allowed to properly execute.

Software Implementation: The software logic was implemented as modules for the AVS software framework. The AVS software framework can execute each of these modules with its own independent thread of execution, and it automatically manages dependencies between multiple components. The following subsections describe the software modules utilized in the invention.

Route Planning: Mapping of the environment and long distance route planning are important concerns in the design of an autonomous vehicle. The design model utilized separates visual mapping from logical mapping and route planning. The logical mapping functions performed by the onboard computers include identification of intersection components, mapping of sensor-visible landmarks, and correction of under-defined map areas. Under-defined map areas consist of regions where the map provided to the robot (i.e., the autonomous vehicle) is insufficiently correlated to the real-world environment. In this case the robot must explore and identify the area along its travel path.

In one embodiment of the invention, translating a pre-existing map into coordinate data was shown to be a more efficient way to obtain steering directions than other methods such as survey. In some situations, pre-existing maps may not be available. If the autonomous vehicle is designed to operate over a "closed" course (i.e., a course set by physical or software-directed boundaries), human control of the vehicle can be used to control the normally autonomous vehicle while the autonomous vehicle maps out the closed course. The autonomous vehicle can map out the designated course by correlating information from its GPS, obstacle scanners, and lane detection sensors.

Once a logical map is obtained indicative of the course and waypoints along the course, the logical map is provided to the onboard computers 53, 54 in for example a Route Network Definition File (RNDF) format, although other formats could be used. A two-pass parser identifies all of the waypoints before verifying that all of the waypoint references are valid. The map is stored in an object-oriented adaptation of the RNDF format and includes extensions for map features derived from the RNDF file.

The first derived feature obtained from the data in the RNDF is the grouping of stop and exit/entry waypoints into intersections. The following is an exemplary mapping/waypoint algorithm. An algorithm first picks any stop waypoint and then finds all of the exits leaving that point and entries leading to it. Next, for each exit in the intersection, if the waypoint following the exit is an entry, the entry/exit pair is added to the intersection. Likewise, for each entry in the intersection, if the waypoint preceding the entry is an exit waypoint, the exit/entry pair is added to the intersection. Finally, if any stops or exits are within a defined distance from the boundary of the intersection they are also added to the intersection. Provisions are made to ensure that each stop or exit only belongs to one intersection.

The second derived feature obtained from the data in the RNDF is the storage of the cost associated with traveling between waypoints. The time taken to drive from one waypoint to the next is a prime candidate for the metric used to pick an optimal route. Time metrics are stored in waypoint, exit and zone objects. The initial cost for each waypoint is calculated optimistically by dividing the segment maximum speed limit by the distance between the waypoint and its previous waypoint. If the waypoint is at the beginning of a lane it has zero cost. The cost of an exit is calculated based on the speed of the entry's segment plus a fixed penalty.

One route finding algorithm of the invention can include a learning component that permits the robot (i.e., the autonomous vehicle) to become more efficient in its planning as it explores more of its environment. By recording the time it takes to travel between waypoints, through intersections, and across zones, a route can be calculated that optimizes for travel time. A record of travel times is maintained for a given RNDF that is used across multiple routes. As traffic patterns change over time, new areas of congestions are marked, and old observations are discredited. A weighted averages formula, as shown in Equation 1, with geometrically decreasing weights is used to calculate the cost of a specific travel unit. The most recent observation has a weight of 0.5 and the weight of each previous observation decreases by one-half.

$S_n$=samples

N=num samples

N=1:sum $S_0$ $$N>1: \text{sum} = S_0 * 1/(2^1) + S_1 * 1/(2^2) + \ldots + S_{N-2} * 1/(2^{N-1}) + S_{N-1} * 1(2^N) \quad (1)$$

The optimal route between checkpoints is determined in one embodiment of the invention by application of a search algorithm known as an A* heuristic-guided search. Other algorithms could similarly be used. The A* search algorithm maintains a priority queue of explored paths. The priorities are determined by the current cost of the path (g(x)) and the estimated cost to the goal (h(x)). In implementation of A* for route planning, g(x) is the sum of the observed average travel time for travel units already explored. The heuristic h(x) is the straight-line distance to the goal checkpoint divided by the maximum speed limit for the course. This heuristic affects a behavior in which the most direct routes are explored first. The A* algorithm has proven to create accurate routes in both simulation and actual testing.

Figure 6A:
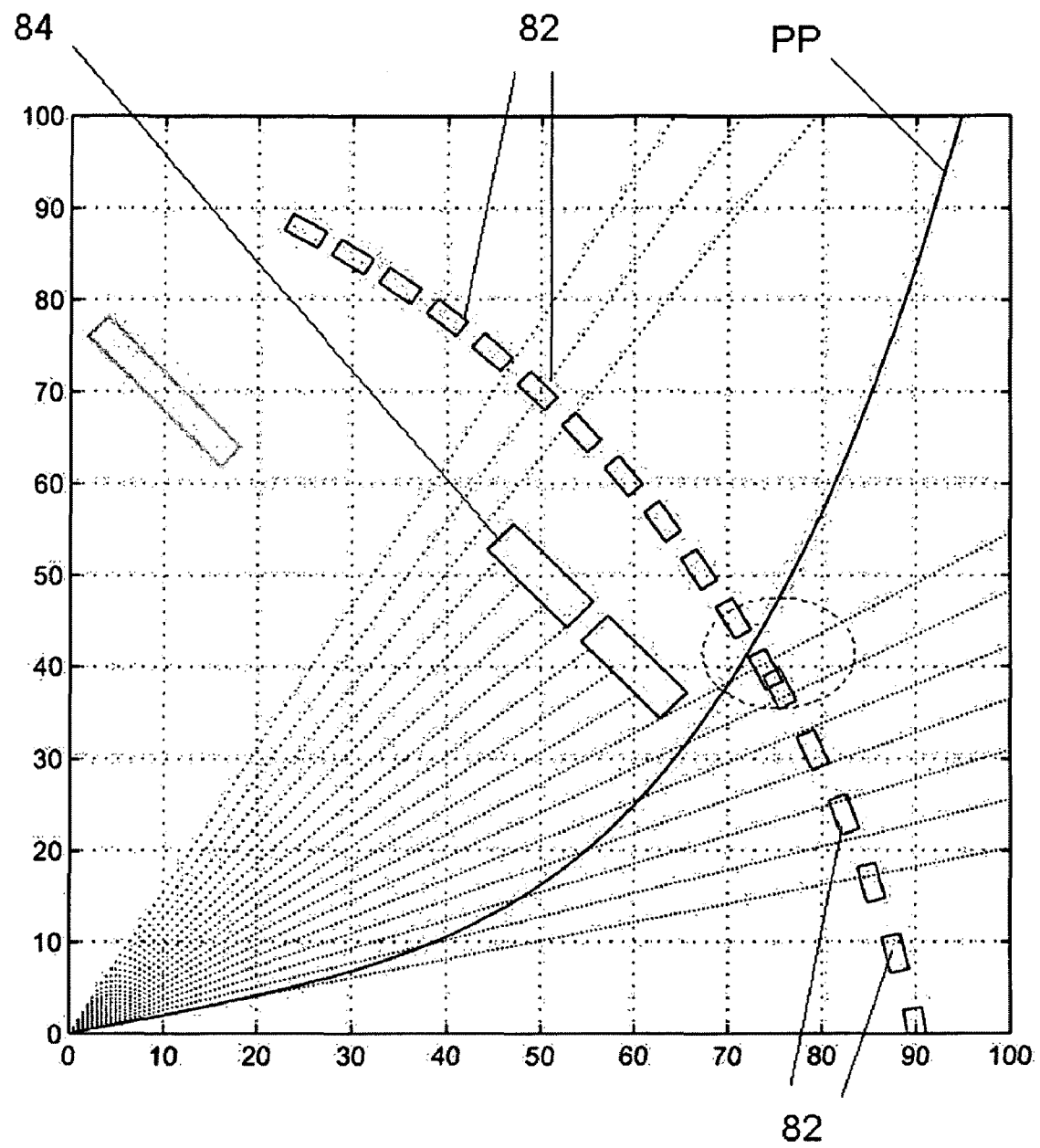
FIG. 6A is a depiction of a variable structure observer algorithm utilization according to one embodiment of the invention.

Variable Structure Observer (VSO): The main functions of the VSO are to provide information integration and prediction of coordinates and trajectories for all of the stationary and moving obstacles in the autonomous vehicle's nearby environment (within approximately 150 meters). The variable structure observer algorithm tracks multiple stationary and moving objects. The variable structure observer algorithm improves the situational awareness of the vehicle and provides the capability to maintain intelligent operation and navigation of the vehicle, even if sensor data is either temporarily lost or becomes temporarily unreliable. This is extremely useful in situations where one obstacle is temporarily hidden by another obstacle, such as when another vehicle is driving through an intersection in front of the autonomous vehicle FIG. 6A is a depiction of a VSO algorithm utilization according to one embodiment of the invention. Specifically, FIG. 6B is a demonstration of the developed variable structure observer in a scenario when the planned path (i.e., the curve labeled PP) of the autonomous vehicle intersects with the path of a radar tracked vehicle (moving obstacle) depicted as a sequence of small moving rectangles 82. In this example, the radar beam (i.e., the angularly displaced lines extending from the lower left corner) is blocked by two trailers 84. (i.e., the larger redctnagles) When the tracked moving obstacle 82 disappears from the radar screen due to blocking by trailers 84, the variable structure observer keeps it in memory by running its model to produce predicted positions of the moving vehicle. The velocity planning along the autonomous vehicle path takes into account the time when the moving obstacle intersects the path. The overlapping rectangles in the dashed circular region represent the error of the predicted position due to uncertainties. Thus, the variable structure observer prevents collisions even when the flow of data is interrupted. The developed variable structure observer allows tracking unlimited number of moving obstacles, limited only by computation power of the system.

The VSO principle is based on the idea of sliding mode observers suggested in (Drakunov, S. V., "Sliding-Mode Observers Based on Equivalent Control Method," Proceedings of the 31st IEEE Conference on Decision and Control (CDC), Tucson, Ariz., Dec. 16-18, 1992, pp. 2368-2370), the entire contents of which are incorporated herein by reference, and is based on general theory of variable structure systems. Its principle can be described as follows: once an obstacle is detected by a sensor system, preliminary data processing is used to identify the obstacle's position, geometry, and velocity vector. The VSO algorithm will automatically create an "identifier" for the obstacle and its mathematical model of motion.

As a result, a state vector [position, geometry, shape, velocity, etc,] for the identified obstacle is produced. The state vector (i.e., its parameters) is constantly updated based on the incoming stream of sensor data. If the sensor data is temporarily lost, the VSO algorithm will continue to provide (by way of a simulation) a prediction of the obstacle's position and velocity to enable the temporarily blinded vehicle to safely stop or avoid obstacles until the sensor data is reacquired.

By running the VSO algorithm forward into future time, the VSO is able to predict not only the current position, but also the future positions of this obstacle for the purpose of path-planning and speed-planning. Certain rules are followed. For example, if the object identified is a moving object traveling along the same road as the autonomous vehicle, the VSO will assume that the identified object stays on the road. For example, if the object identified is a moving object which has been traveling along the same road as the autonomous vehicle and which has been travelling at a near constant speed, the VSO will assume that the identified object stays on the road and continues at the same speed (unless so other object intervenes). The VSO combines the state vectors of all obstacles in a nearby environment into one variable structure model of the vehicle's operating environment, which changes dynamically with the environment. The dimension of the state vector of the observer constantly changes since the VSO will add new models for obstacles that are entering this area and remove obstacles when they have left the area.

The Variable Structure Observer in one embodiment of the invention is based on the theory of systems with sliding modes. The use of sliding modes is understood from nonlinear math and has been used in other "systems" to analyze the time behavior of a system. In the variable structure observer of the invention, sliding modes are used for reconstruction of the state vector from observation data for strongly nonlinear systems in the presence of uncertainties. A more detailed description of utilization of the VSO in the context of route planning is included below.

In actual practice, the VSO provides another benefit. By including a mathematical model of vehicle motion in its calculations, the VSO automatically filters out fluctuations that can occur in sensor data. This is particularly important with the laser scanner sensors since the velocity vectors (which these sensors calculate) can contain significant jitter.

Path-Planning: The path-planning algorithms of the invention avoid obstacles and routinely steer the vehicle within a planned corridor. In one embodiment, these algorithms without cause will not deviate the vehicle from the planned corridor. However, should the vehicle leave the route corridor for some reason, the navigation system will detect this and provide a safe route back into the corridor. If a waypoint is missed, the navigation system will simply continue to the next feasible waypoint on the path. If the path is obstructed by an obstacle, the path planning systems will determine a path around the obstacle.

Path planning in one embodiment of the invention is accomplished through the use of cubic b-splines designed to follow the center of the planned route while still ensuring that the path is not impossible for the vehicle to navigate. This assurance means that the curvature at any point along the path is below the maximum curvature that the vehicle can successfully follow. In addition, the curvature is kept continuous so that it is not necessary to stop the vehicle in order to turn the steering wheel to a new position before continuing. B-splines were chosen for use in the path planning algorithms primarily because of the ease in which the shape of their resulting curves can be controlled. After an initial path is created that follows the center of the corridor, the path is checked against the obstacle repository to determine if it is a safe path. If the path is not safe, a simple algorithm generates and adjusts control points on the problem spots of the curve until the spline avoids all known obstacles while still containing valid maximum curvature. At this point, the path is both safe and drivable.

The path planning of the invention can also uses a Level of Detail (LOD) based obstacle avoidance algorithm along with several planning algorithms to plan paths around obstacles. LOD analysis in one embodiment of the invention permits running the same algorithm with different levels of detail. For example, running with less detail (e.g., to accommodate large safety margins), then iteratively increasing the detail (e.g., to accommodate smaller safety margins) until a valid path is found. The path planning algorithms run using several different parameters until a valid path is found. The initial parameters use safety margins (for example the clearance of the vehicle from an obstacle or between obstacles), while the final parameters use no safety margins around obstacles. This ensures that if a path is available that will avoid an obstacle with a large margin of error (e.g., vehicle lateral clearance) the path planning software selects that path. Otherwise, the planning algorithm will keep reducing the safety margin around obstacles until a valid path is determined.

The invention accommodates factors such as vehicle thrust and external forces on the vehicle. System identification is a method used by the invention by which the parameters that define a system can be determined by relating input signal into a system with the system's response to develop a transfer function that behaves in the same way (or a similar way) as the actual vehicle system. For instance, when attempting to control the speed of a vehicle, the inputs are the brake and accelerator position and the output is the vehicle's speed. The system model can be described by a transfer function H(s), $$y(s)=H(s)u(s), \quad (8)$$

where u(s) is the system input (brake and accelerator position) and y(s) is the system output (velocity). System identification was applied to real world data from the vehicle propulsion system to arrive at a transfer function H(s) of the vehicle system for example empirically tested for the working vehicle until confidence in an accurate transfer function was obtained.

Accordingly, speed control of the vehicle, according to the invention, accommodated not only accelerator and brake functions but also accommodated many other factors in the physical engine system. For instance, since the working vehicle had a gas-electric hybrid engine, the coupling of the two propulsion systems was controlled by an inaccessible factory-installed on-board computer tuned for fuel efficiency. Consequently, the mapping of the requested pedal position and the actual position achieved was not linear and had to be remapped in software by empirical determination. In one embodiment of the invention, the speed of the vehicle is controlled by an integrated proportional-derivative (PD) controller. This controller bases its output on the previous output and on the current error and derivative of the error. In the time domain, the controller can be written as $$u(t2)=(t2-t1)(K_p e(t_2)+K_d e'(t_2))+u(t_1) \quad (9)$$

where $K_p$ and $K_d$ are tunable coefficients, u(t) is the output of the controller at time t, and e(t) is the error at time t. The error was defined as actual output subtracted from target output. Actual output was reported by the RT3000™, and target speed was derived from the path planning algorithms.

The integrated PD controller was designed and tuned against the derived transfer function detailed above. For instance, the weights (for the proportionate control in the PD controller) needed for optimal performance were derived initially against the computational model of the derived transfer function, and then tuned when operated on the vehicle.

Accelerator and steering wheel control was achieved in the working vehicle using two separate processes, which were both independent of the path-planning systems. Once a path was decided on by the path-planning algorithms, acceleration and steering is used exclusively to remain on the chosen path. Since paths are checked for feasibility upon creation, it was assumed by the control systems that all paths given are possible for the vehicle to achieve. In this manner (although the invention can use other starting assumptions), it becomes the burden of the control systems to decide how best to proceed in order to follow the selected path.

The steering controller for the working vehicle in one embodiment was a lead-lag controller based on the classical single-track model or bicycle model described by Riekert and Schunck "Zur fahrmechanik des gummibereiften kraftfahrzeugs," in Ingenieur Archiv, vol. 11, 1940, pp. 210-224, the entire contents of which are incorporated herein by reference. A lead compensator increases the responsiveness of a system; a lag compensator reduces (but does not eliminate) the steady state error. The lead-lag compensator was based on the frequency response of the system. The lead-lag compensator was similar to that described by D. Bernstein, A students guide to classical control, IEEE Control Systems Magazine, vol. 17, pp. 96-100 (1997), the entire contents of which are incorporated herein by reference. The resulting controller in the working vehicle was a convolution of the two lead and lag functions multiplied by the low frequency gain, which was 0.045. Adaptive estimation parameters were used. Adaptive estimation uses a set of values (parameters) first gained from applying the theoretical functions and then iteratively tests and modifies the parameters in real-world scenarios (e.g., deep sand, rough terrain, and other terrain types) until the parameters are perfected.

$$F_{lead}(s) = \frac{850s+1}{900s+1} \quad (10)$$

$$F_{lag}(s) = \frac{2s+4}{0.2s+1} \quad (11)$$

The discretized controller was implemented as shown in (12) and (13), where x is the state vector, $\dot{x}$ is the derivative of the state vector with respect to time, u is the input vector and $\delta_f$ is the output steering angle as measured at the tire with respect to the centerline. The state vector x is defined as $[y_s \, \psi]$ where $y_s$ refers to the distance from the virtual sensor to the reference path and $\psi$ is the vehicle's yaw rate. The virtual sensor is a point projected a given distance ahead of the vehicle along the vehicle's centerline. This point is commonly referred to as the look-ahead point, and the distance from the look-ahead point to the RT3000 is referred to as the look-ahead distance.

$$\dot{x} = \begin{bmatrix} 0.90475 & -0.00054 \\ 0.00054 & 0.99998 \end{bmatrix} x + \begin{bmatrix} -1.07538 \\ 0.00277 \end{bmatrix} u \quad (12)$$

$$\delta_f = [0.02150 \quad 0.00005]x + [0.00005]u \quad (13)$$

The input vector u to the controller is defined as $[y_s]$. The output of the controller is the steering angle measured at the tire with respect to the centerline.

The steering and control system in the working vehicle assumed that the relationship between the steering wheel angle and the resulting tire angle was linear and that the location of the vehicle's center of gravity was at the midway point between the front and rear axles. As a measure of safety the magnitude of the $y_s$ signal was monitored to prevent the vehicle from becoming unstable. If $y_s$ were to cross a given threshold, meaning the vehicle is severely off path, the speed of the vehicle was reduced to 2 mph. This allowed the vehicle to return onto the desired path and prevented a possible rollover.

Thus, the route-planning module is used to create a global route that the autonomous vehicle should generally follow, but a local path planning module, named the Velocity and Path Planner (VPP), is used to translate from the global route to the current local path. The local path contains both the planned positions of the vehicle and the planned target velocities of the vehicle. The local path can be regenerated multiple times per second as both the vehicle's state and the surrounding environment changes.

The VPP uses the information from the Variable Structure Observer (VSO) to plan and update the time-space trajectory and velocity profile of the autonomous vehicle. The VPP aims to avoid static obstacles by appropriate route planning (i.e., steering from the static obstacle) and aims to adjust a speed of the autonomous vehicle to avoid moving obstacles that will cross the planned path of the autonomous vehicle (including coming to a complete stop if necessary to avoid an obstacle). The optimal path calculation is conducted in the extended domain, which includes time-space characteristics of the obstacles and their future positions. The trajectory calculation is done in three logical steps presented here in this fashion for the purpose of simplifying this discussion.

During the first step, the VPP calculates the (x,y)-space trajectory based on the provided GPS points from the global route. These points are then connected by a smooth curve, which is calculated using cubic or higher order spline interpolation.

In the second step, the VPP calculates the time-optimal trajectory in the extended time-space domain $\{x^*(t), y^*(t), t^*(t)\}$, which satisfies the velocity constraints (maximum and minimum speed limits) and avoids any known or detected obstacles. The optimal and quasi-optimal trajectories with the aforementioned constraints are calculated using a combination of calculus of variations, Bellman dynamic programming, and Pontryagin's minimum principle. Pontryagin's minimum principle provides the necessary conditions for time-optimal control in the case of control and state variable constraints. The calculation is done using a sliding mode algorithm, as described above. FIG. 6B is an exemplary distance vs. time S-T diagram which shows the original speed plan (in the diagonal line) and the corrected path (in the line deviating to the right and proceeding diagonally in parallel with the original speed path) taking into account observed obstacles (i.e., the oval shapes). In this chart, s represents distance along the path, and time is the expected time to be at that point along the path.

In the third step, the VPP uses an on-line quasi-optimal calculation of the trajectory that is closest to the trajectory calculated in Step 2 that satisfies acceleration/deceleration constraints while preserving velocity and vehicle safety. At this point, the ride comfort can be taken into consideration if it does not interfere with safe operation. This trajectory calculation is performed by the Velocity and Path Planner using in one embodiment sliding mode algorithms.

The Velocity and Path Planner permits avoidance of all types of obstacles, in the space-time domain (S-T domain), by altering the vehicle's velocity. If there is no mathematical solution and the vehicle cannot avoid the obstacle by slowing down, a swerving maneuver is next implemented to avoid the obstacle, if the obstacle is capable of being avoided. This type of swerving maneuver is acceptable for example if another vehicle is not behaving erratically.

The results of the VPP are repeatedly evaluated to determine if a lane-change or other path-altering maneuver should be attempted. One goal of the VPP can be to achieve optimal velocity, so the planning algorithm will attempt to pass another vehicle if the other vehicle is stopped for too long or even if the autonomous vehicle is slowed down too much by the other vehicle in front of it.

Figure 6C:
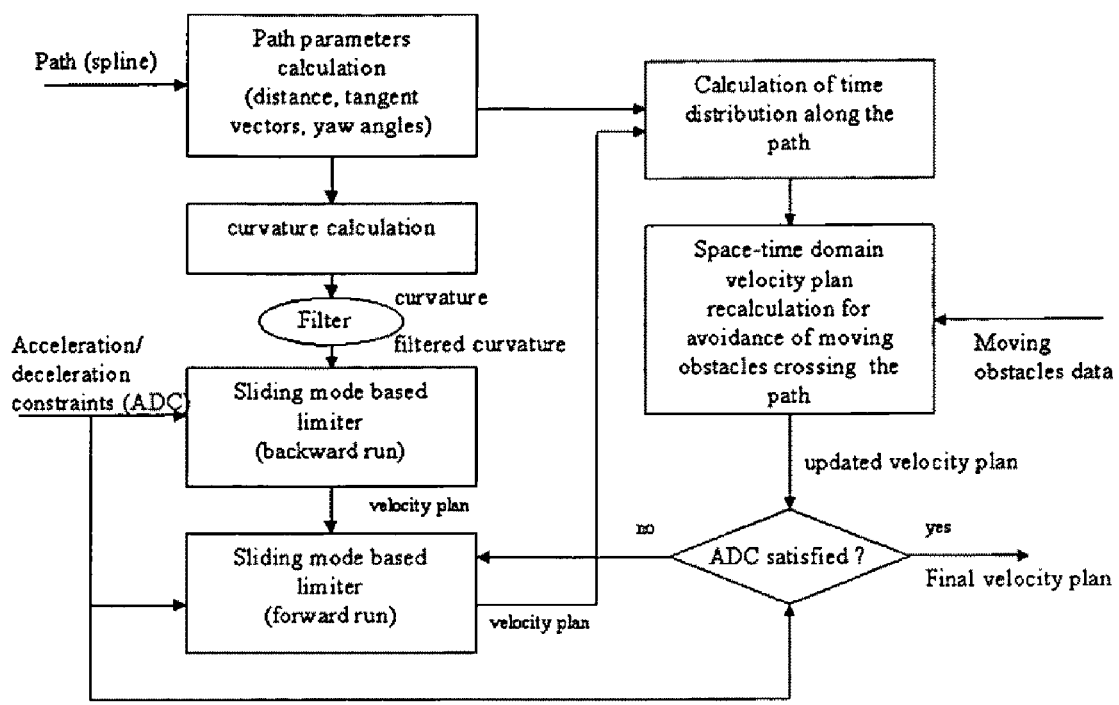
FIG. 6C is a flow diagram illustrating the VPP calculation process of one embodiment.

More generally, the VPP algorithm of the invention can be illustrated in FIG. 6C. Specifically, FIG. 6C is a flow diagram illustrating the VPP calculation process of one embodiment. The process can be conceptualized as starting by receiving an intended travel path plan (for example represented as a numerical spline) and then calculating path parameters (e.g., distance, tangent vectors, yaw angles, etc.). Next, the process takes into consideration curvature calculations performed on the calculated path parameter and takes into consideration acceleration/deceleration constraints in performing both forward and backward sliding mode limiter calculations. A velocity plan is produced.

The process having now the intended travel path plan and the calculated velocity plan proceeds to calculate a time distribution along the travel path. Subsequently, the process considers moving obstacle data to recalculate a space-time domain velocity plan for avoidance of moving obstacles crossing the intended travel path and thereby produces a modified velocity plan. If the modified velocity plan meets predetermined or preset acceleration/deceleration constraints, the modified velocity plan which avoids moving obstacles in this embodiment is accepted. If not, the process reiterates by beginning again to calculate a new velocity plan by a forward sliding mode limiter calculation.

Steering Control System: The software planning modules can generate any paths as long as the paths satisfy certain constraints related to curvature and velocity. The vehicle can accurately follow the paths with a high level of precision. Due to this high level of driving precision, the planning modules can generate paths that weave through tight fields of obstacles successfully. Multiple planning modules can be used for redundancy, and can also be used to generate multiple candidate paths at the same time. If multiple paths are created, then the one with the best score (score can be calculated in many different ways: shortest time, shortest distance, least cluttered with obstacles, etc.) is used.

Moreover, since the path planning components operate most effectively when the vehicle can drive the generated paths accurately, particular emphasis was placed on the steering controller during development of the autonomous vehicle of the invention. Below described in more detail is a high performance steering algorithm of the invention. The realized results on the high performance steering algorithm are shown in FIGS. 7-9.

Figure 7:
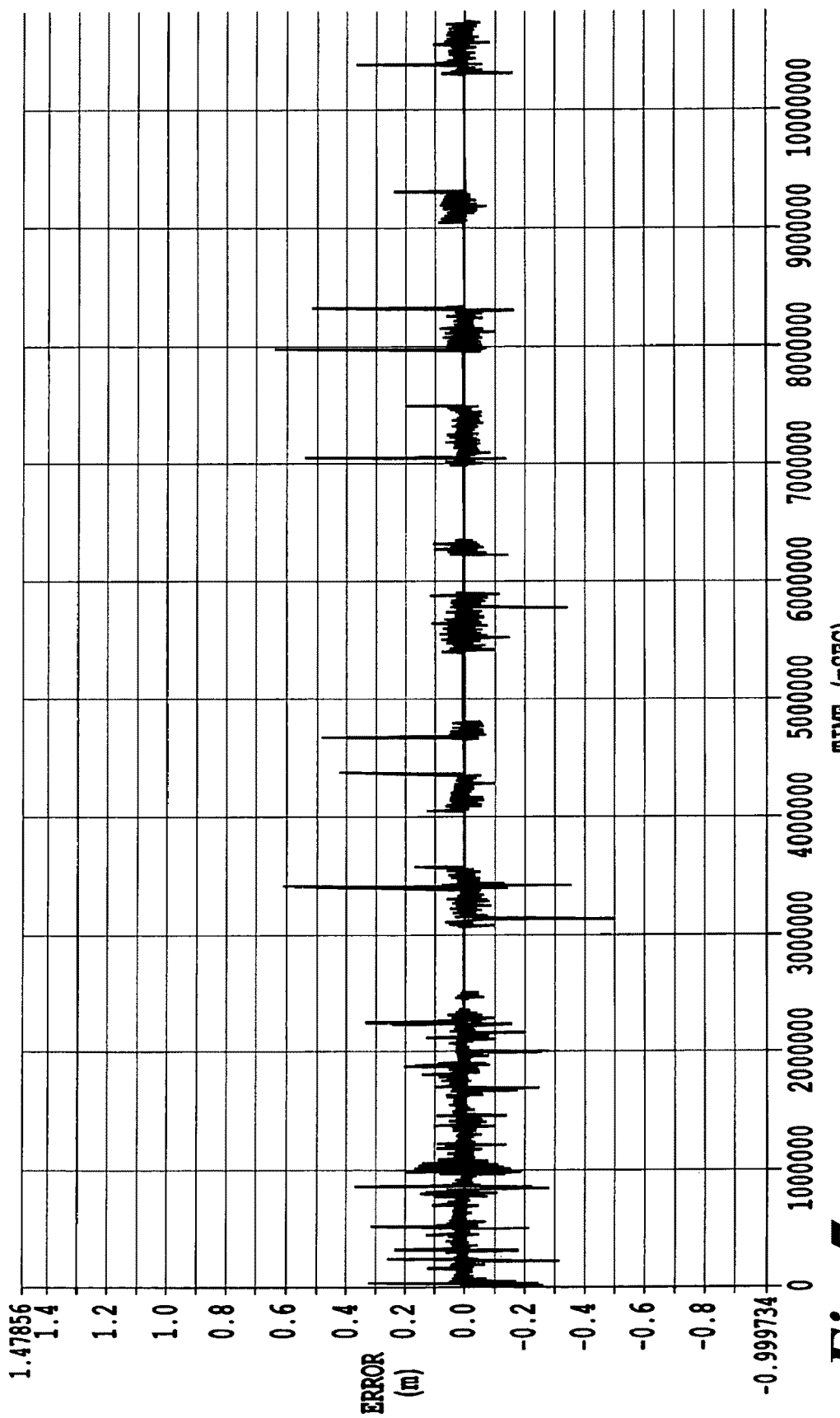
FIG. 7 is a depiction showing the standard deviations for the vehicle's steering controller of the invention in an urban environment.

FIG. 7 is a depiction showing the standard deviations for the vehicle's steering controller of the invention in an urban environment. As FIG. 7 illustrates that the vehicle's steering controller is capable of driving with extremely high accuracy, even in an urban environment and at high speeds, permitting the autonomous vehicle to achieve higher stable speeds during a winding urban course. During urban driving, the signal from the GPS can be quite noisy due to the effect that tall buildings and trees can have on the GPS signals. This noise can make autonomous driving at high speeds in an urban environment much more difficult.

Figure 8:
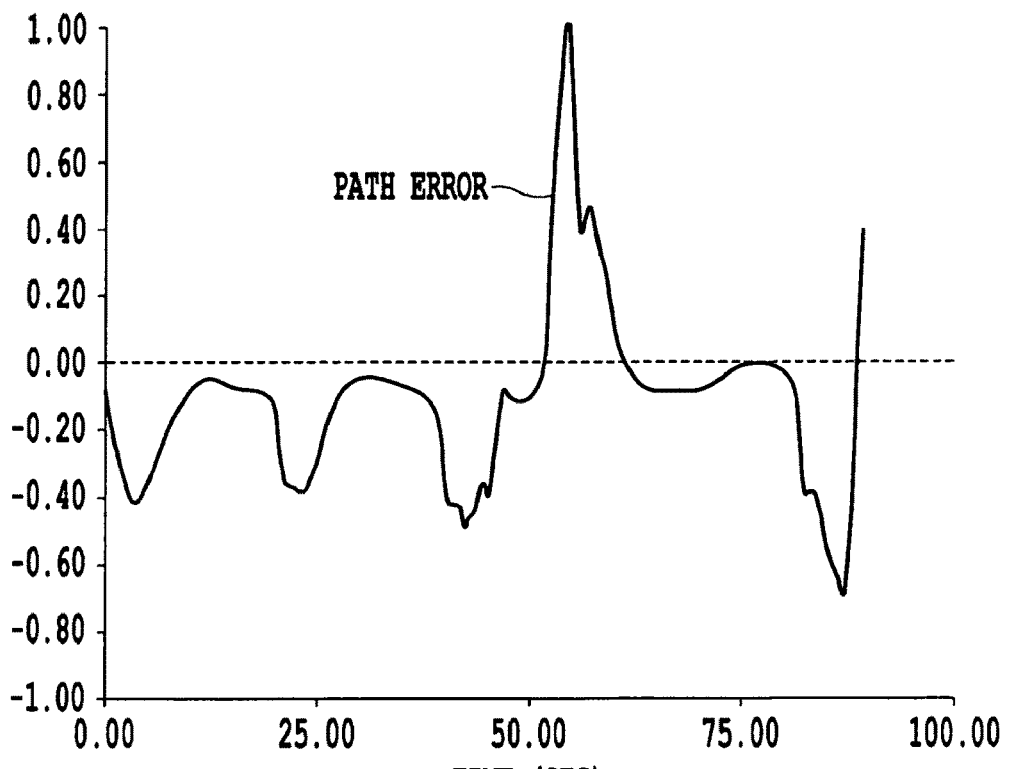
FIG. 8 is a depiction showing maintenance by the autonomous vehicle of the invention of a standard deviation of under 25 cm from a planned path even while negotiating a slalom course containing hairpin turns at a constant speed of 30 km/hr.
Figure 9:
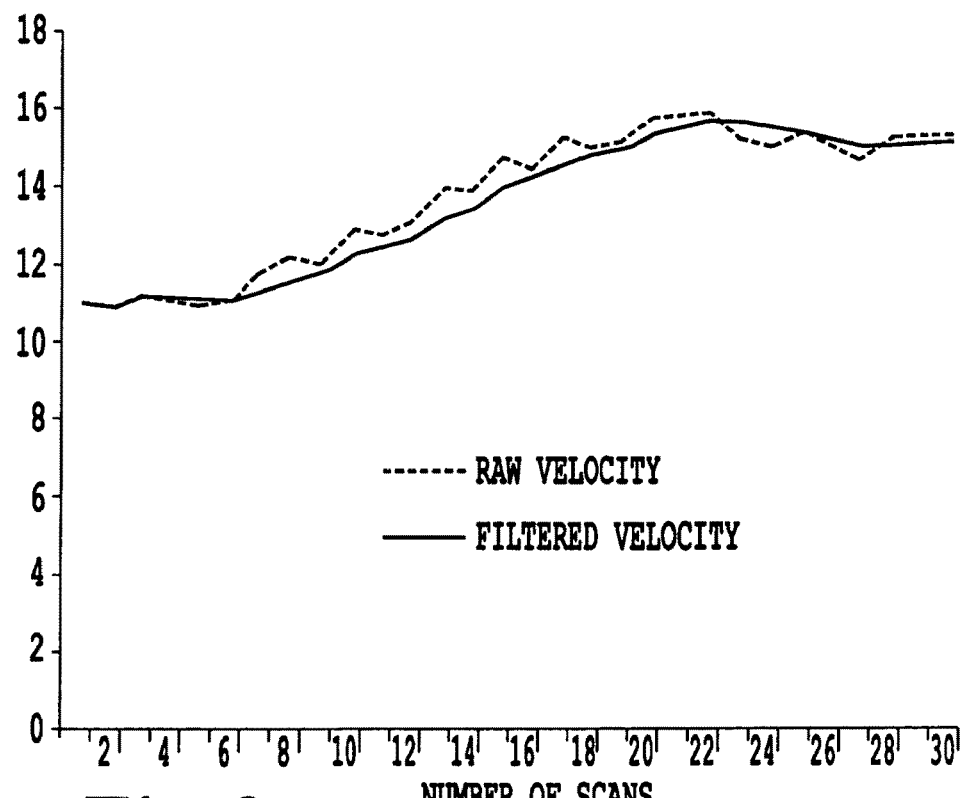
FIG. 9 is a depiction of filtering the velocity values from a laser scanning system of the invention.

FIG. 8 shows that the steering controller of the invention can maintain a standard deviation from the path of under 25 cm even while driving a difficult slalom course containing hairpin turns at a constant speed of 30 km/hr. This type of accuracy is difficult to achieve at high speeds during hairpin turns because the vehicle's tires are sliding/skidding on the ground, which is an additional variable that must be accounted for by the steering control algorithms during these maneuvers.

In addition to the precision driving capabilities, data filtering algorithms using statistical averaging and filtering methods have been shown to reduce the noise in obstacle sensors on the autonomous vehicle of the invention. FIG. 9 shows the results of filtering the velocity values from a laser scanning system. FIG. 9 shows that the velocity values provided by the laser scanners contained significant noise that was successfully removed.

High Performance Steering Algorithm: In one embodiment of the invention, there is provided a novel method of autonomous vehicle steering. The method includes following of a moving point (x*(s), y*(s)) along the path on the ground to generate a steering command. The method for executing the steering is based on a controlled time-function s(t) of the distance from the origin of the moving point along the path. The control of the function s(t) and the steering angle $\phi$ are chosen in such a way that the vector error $\overline{E}(t)$ of the actual vehicle position (x(t), y(t)) from the moving point (x*(s(t)), y*(s(t))) on the ground $$\vec{E}(t) = \begin{bmatrix} x(t) \\ y(t) \end{bmatrix} - \begin{bmatrix} x^*(s(t)) \\ y^*(s(t)) \end{bmatrix}$$

satisfies a desired asymptotically stable differential equation, for example, of the form $d/dt \overline{E}(t) = -k\overline{E}(t)$, where the gain $k>0$, or more general $d/dt\ \overline{E}(t) = F(\overline{E}(t))$. As a result the error converges to zero, thus, providing robust steering of the vehicle along the path. Below we provide one possible implementation of this method, where the choice of the controller gain k is based on the optimal convergence condition.

Figure 10:
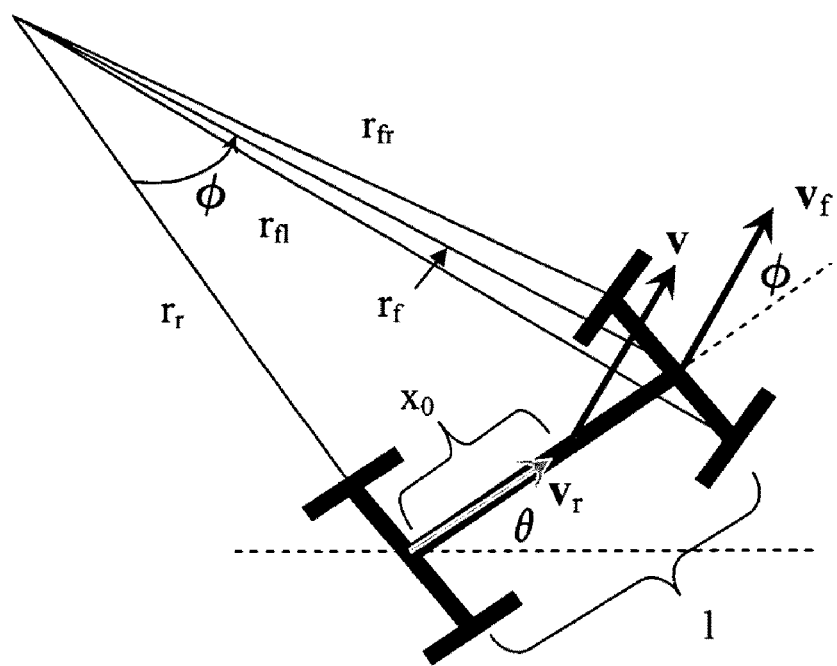
FIG. 10 is a schematic depicting a completely nonholonomic model for prediction of autonomous vehicle trajectories.

In case of completely nonholonomic model (see FIG. 10), there is assumed no side slip of both front and rear tire. The kinematical part of the nonholonomic model describing X-Y coordinates of the point located on the vehicle longitudinal axis on the distance $x_o$ from the rear differential is $$\begin{bmatrix} \dot{x} \\ \dot{y} \end{bmatrix} = v_f \begin{bmatrix} \cos(\theta) \\ \sin(\theta) \end{bmatrix} \cos(\varphi) + x_0 \dot{\theta} \begin{bmatrix} \sin(\theta) \\ -\cos(\theta) \end{bmatrix} \quad (1)$$

$$\dot{\theta} = v_f \frac{1}{l} \sin(\varphi)$$

where x, y are coordinates of the read point in the global frame, $\theta$ is yaw angle, $\phi$ is front heading angle, $v_f$ is the front velocity. The rear wheels velocity is $v_r = v_f \cos(\phi)$.

Figure 11:
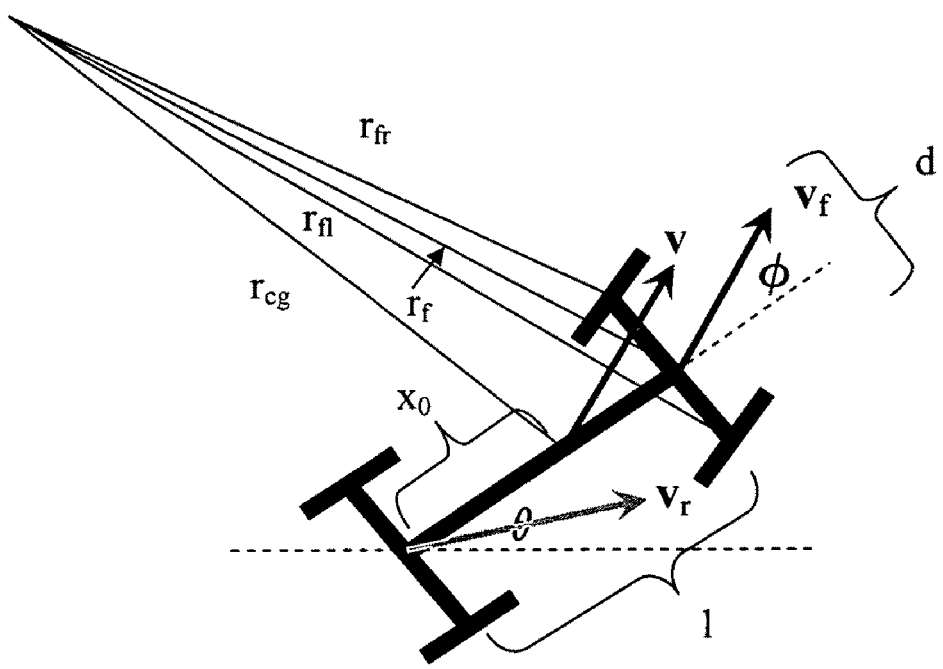
FIG. 11 is a schematic depicting a partially nonholonomic model for prediction of autonomous vehicle trajectories.

Now let us consider the possibility of the rear wheels side slip, while the front wheels do not slip. See FIG. 11.

Desired path as a function of the distance s along the path:

$$\begin{bmatrix} x^*(s) \\ y^*(s) \end{bmatrix}$$

Distance of the virtual point from the path beginning:

s(t)

XY-position of the virtual point at time t:

$$\begin{bmatrix} x^*(s(t)) \\ y^*(s(t)) \end{bmatrix}$$

Vector error of the current vehicle position from the virtual point:

$$\begin{bmatrix} \overline{x}(t) \\ \overline{y}(t) \end{bmatrix} = \begin{bmatrix} x(t) \\ y(t) \end{bmatrix} - \begin{bmatrix} x^*(s(t)) \\ y^*(s(t)) \end{bmatrix} = \vec{E}(t)$$

System for the error:

$$\begin{bmatrix} \dot{\overline{x}}(t) \\ \dot{\overline{y}}(t) \end{bmatrix} = v_f \begin{bmatrix} \cos(\theta) \\ \sin(\theta) \end{bmatrix} \cos(\varphi) + v_f \frac{x_0}{l} \begin{bmatrix} \sin(\theta) \\ -\cos(\theta) \end{bmatrix} \sin(\varphi) - \begin{bmatrix} x^{*\prime}(s(t)) \\ y^{*\prime}(s(t)) \end{bmatrix} w \quad (2)$$

$$\dot{s}(t) = w$$

$$\dot{\theta} = v_f \frac{1}{l} \sin(\varphi)$$

where w is the virtual point velocity along the path (this is virtual control)

$$\vec{H}(t) = \begin{bmatrix} x^{*\prime}(s(t)) \\ y^{*\prime}(s(t)) \end{bmatrix}$$

is a virtual point heading (unit) vector:

$$\|\vec{H}(t)\| = \left\| \begin{bmatrix} x^{*\prime}(s(t)) \\ y^{*\prime}(s(t)) \end{bmatrix} \right\| = 1$$

Upon choosing the virtual control from a condition of maximum rate of convergence of the error given the velocity, the right hand of the first equation in (2) is $$v_f \begin{bmatrix} \cos(\theta) \\ \sin(\theta) \end{bmatrix} \cos(\varphi) + v_f \frac{x_0}{l} \begin{bmatrix} \sin(\theta) \\ -\cos(\theta) \end{bmatrix} \sin(\varphi) - \begin{bmatrix} x^{*\prime}(s(t)) \\ y^{*\prime}(s(t)) \end{bmatrix} w = -k \begin{bmatrix} \overline{x}(t) \\ \overline{y}(t) \end{bmatrix} \quad (3)$$

then $$\begin{bmatrix} \dot{\overline{x}}(t) \\ \dot{\overline{y}}(t) \end{bmatrix} = -k \begin{bmatrix} \overline{x}(t) \\ \overline{y}(t) \end{bmatrix}.$$

This guarantees convergence of the error to zero with exponential rate k:

$$\overline{x}(t) = \overline{x}_0 e^{-kt} \to 0, \overline{y}(t) = \overline{y}_0 e^{-kt} \to 0 \text{ as } t \to \infty.$$

From (3) one obtains that the tire angle $\phi$ should satisfy:

$$v_f \begin{bmatrix} \cos(\theta) \\ \sin(\theta) \end{bmatrix} \cos(\varphi) + \quad (4)$$

$$v_f \frac{x_0}{l} \begin{bmatrix} \sin(\theta) \\ -\cos(\theta) \end{bmatrix} \sin(\varphi) = \begin{bmatrix} x^{*\prime}(s(t)) \\ y^{*\prime}(s(t)) \end{bmatrix} w - k \begin{bmatrix} \overline{x}(t) \\ \overline{y}(t) \end{bmatrix} = \vec{H}(t)w - k\vec{E}(t)$$

Taking the norm squared of both sides of (4) we obtain:

$$v_f^2 \left[ \cos^2(\varphi) + \left(\frac{x_0}{l}\right)^2 \sin^2(\varphi) \right] = w^2 - 2kw < \vec{H}(t), \quad (5)$$

$$\vec{E}(t) > +k^2 \|\vec{E}(t)\|^2$$

Given k from this equation we can find w as $$w = k[<\vec{H}(t), \vec{E}(t)> + \sqrt{<\vec{H}(t), \vec{E}(t)>^2 - \|\vec{E}(t)\|^2 + v^2/k^2}], \quad (6)$$

where we denoted $$v = v_f \sqrt{\cos^2(\varphi) + \left(\frac{x_0}{l}\right)^2 \sin^2(\varphi)}$$

the velocity of the point $x_o$.

On the other hand, from (5) one can find an optimal value of k, by differentiating (5) with respect to w and setting the derivative of k to zero:

$$0 = 2w - 2k'w<\vec{H}(t), \vec{E}(t)> - 2k<\vec{H}(t), \vec{E}(t)> + 2kk'\|\vec{E}(t)\|^2 \quad (7)$$

At the optimal point $k'(w_{opt}) = 0$. As can be easily seen, this optimum is a maximum in the area $w \geq 0, k \geq 0$. Indeed, the equation (5) represent a second order curve $Aw^2 + 2Bwk + Ck^2 = D$ on the wk-plane. Since $$|<\vec{H}(t), \vec{E}(t)>| \leq \|\vec{E}(t)\|$$

it follows that $B^2 < AC$ and, thus, this is an ellipse. Therefore, $k_{opt} > 0$ is a maximum.

From (7)

$$0 = 2w - 2k<\vec{H}(t), \vec{E}(t)>$$

hence $$w_{opt} = k_{opt}<\vec{H}(t), \vec{E}(t)>,$$

or from (5)

$$v^2 = k_{opt}^2 <\vec{H}(t), \vec{E}(t)>^2 - 2k_{opt}^2 <\vec{H}(t), \vec{E}(t)>^2 + k_{opt}^2 \|\vec{E}(t)\|^2$$

$$k_{opt}^2 = \frac{v^2}{\|\vec{E}(t)\|^2 - <\vec{H}(t), \vec{E}(t)>^2}$$

which gives $$k_{opt} = \frac{v}{\sqrt{\|\vec{E}(t)\|^2 - <\vec{H}(t), \vec{E}(t)>^2}}.$$

As error E(t) converges to zero the values of $k_{opt}$ may become very large. In order to limit k, one can use a near optimal value.

Introducing $$k^* = \frac{1}{\sqrt{\|\vec{E}(t)\|^2 - <\vec{H}(t), \vec{E}(t)>^2 + \varepsilon^2}}, \quad (8)$$

where $\varepsilon > 0$ is a small constant (it guarantees that $k^*$ is bounded) one has $k_{opt} \approx vk^*$ Substituting (8) into (6), one obtains near optimal value of w: $w_{opt} \approx vw^*$, where $$w^* = \frac{<\vec{H}(t), \vec{E}(t)> + \varepsilon}{\sqrt{\|\vec{E}(t)\|^2 - <\vec{H}(t), \vec{E}(t)>^2 + \varepsilon^2}} = k^*[<\vec{H}(t), \vec{E}(t)> + \varepsilon]$$

So, $$w_{opt} \approx k^* v_f [<\vec{H}(t), \vec{E}(t)> + \varepsilon] \sqrt{\cos^2(\varphi) + \left(\frac{x_0}{l}\right)^2 \sin^2(\varphi)}.$$

From (4), one has $$v_f \begin{bmatrix} \cos(\theta) \\ \sin(\theta) \end{bmatrix} \cos(\varphi) + v_f \frac{x_0}{l} \begin{bmatrix} \sin(\theta) \\ -\cos(\theta) \end{bmatrix} \sin(\varphi) = \vec{H}(t)vw^* - vk^*\vec{E}(t)$$

From this one obtains:

$$\cos(\varphi) = \left\langle \begin{bmatrix} \cos(\theta) \\ \sin(\theta) \end{bmatrix}, \vec{H}(t)w^* - k^*\vec{E}(t) \right\rangle \frac{v}{v_f}$$

$$\sin(\varphi) = \left\langle \begin{bmatrix} \sin(\theta) \\ -\cos(\theta) \end{bmatrix}, \vec{H}(t)w^* - k^*\vec{E}(t) \right\rangle \frac{v}{v_f} \frac{l}{x_0}$$

In the right hand sides of these equations, $$v = v_f \sqrt{\cos^2(\varphi) + \left(\frac{x_0}{l}\right)^2 \sin^2(\varphi)}$$

which also depends on the heading angle $\phi$. So the one way to express $\phi$ is to divide the two equations to obtain $\tan(\phi)$ As a result:

$$\varphi = \arctan \left\{ \frac{\left\langle \begin{bmatrix} \sin(\theta) \\ -\cos(\theta) \end{bmatrix}, \vec{H}(t)w^* - k^*\vec{E}(t) \right\rangle \frac{l}{x_0}}{\left\langle \begin{bmatrix} \cos(\theta) \\ \sin(\theta) \end{bmatrix}, \vec{H}(t)w^* - k^*\vec{E}(t) \right\rangle} \right\}. \quad (9)$$

Now consider the possibility of the rear wheels side slip, while the front wheels do not slip. See FIG. 11.

In this case the velocity of the rear point $v_r$ is not necessarily aligned with the car longitudinal axis. Center of mass is one standard point of reference on the vehicle, but, in fact, any point can be considered as a base for rotation. Since in this example the system is nonholonomic, it is more convenient to consider the point between the front wheels rather than the center of mass. Accordingly, the center of mass as a point of reference can be used for controlled cornering with skid.

Then one has $$v_f \cos(\varphi) = \left\langle \vec{v}, \begin{bmatrix} \cos(\theta) \\ \sin(\theta) \end{bmatrix} \right\rangle$$

$$v_f \sin(\varphi) = \left\langle \vec{v}, \begin{bmatrix} \sin(\theta) \\ -\cos(\theta) \end{bmatrix} \right\rangle + \dot{\theta}(l - x_0)$$

therefore, $$\begin{bmatrix} \dot{x} \\ \dot{y} \end{bmatrix} = v_f \begin{bmatrix} \cos(\theta) \\ \sin(\theta) \end{bmatrix} \cos(\varphi) + [v_f \sin(\varphi) - (l - x_0)\dot{\theta}] \begin{bmatrix} \sin(\theta) \\ -\cos(\theta) \end{bmatrix} \quad (10)$$

$$J\ddot{\theta} = l[-F_{rlateral} + mv_f^2 \tan(\varphi)/l]$$

where the second term in the last equation represents approximation of the centrifugal force. In this expression $r_{cg} \approx l/\tan(\phi)$ is approximately the instant turn radius.

One can assume that $$F_{rlateral} = F_{rlateral\_max} \text{sign}(\sigma), \quad (11)$$

where $$\sigma = \theta - \frac{v_f}{l}\sin(\varphi). \quad (12)$$

As can be seen, $F_{lateral}$ is a discontinuous function of the variable σ. In such system the phenomenon of sliding mode can occur (see for example, DeCarlo R. and S. Zak, S. V. Drakunov, "Variable Structure and Sliding Mode Control," chapter in The Control Handbook a Volume in the Electrical Engineering Handbook Series, CRC Press, Inc., 1996, the entire contents of which are incorporated herein by reference). In this system, a sliding mode occurs if there is enough margin of the lateral friction force. Namely, $$F_{rlateral} > mv_f^2 \tan(\phi)/l. \quad (13)$$

In sliding mode $$\sigma = \theta - \frac{v_f}{l}\sin(\varphi) = 0,$$

and the first equation of the system (10) becomes (1). In sliding mode, the lateral force can be found using equivalent control method (see, for example, the reference above), which states that the discontinuous function in sliding mode can be replaced by equivalent value obtained from the equality $\dot\sigma=0$.

Differentiating one obtains $$\dot\sigma = \frac{l}{J}[-F_{rlateral} + mv_f^2\tan(\varphi)/l] - \frac{1}{l}[\dot v_f\sin(\varphi) - v_f\cos(\varphi)\dot\varphi].$$

From here $$F_{rlateral\_equivalent} = mv_f^2\tan(\varphi)/l - \frac{J}{l^2}[\dot v_f\sin(\varphi) + v_f\cos(\varphi)\dot\varphi]$$

This expression and the inequality (13) is used for controlling (starting or preventing at desired moments) the skid, by manipulating velocity and/or steering angle.

In case of the skid occurs (due to natural conditions of low lateral friction force, or artificially created) the steering algorithm described below is used. The virtual point velocity is calculated similarly to the previous case taking into account modified model (10) instead of (1). As a result, one obtains:

$$w_{opt} \approx k^*[\,<\vec H(t), \vec E(t)> + \varepsilon]\sqrt{v_f^2\cos^2(\varphi) + [v_f\sin(\varphi) - (l-x_0)\dot\theta]^2},$$

where $k^* = \dfrac{1}{\sqrt{\|\vec E(t)\|^2 - <\vec H(t), \vec E(t)>^2 + \varepsilon^2}}$ is the same as before.

$$v = \sqrt{v_f^2\cos^2(\varphi) + [v_f\sin(\varphi) - (l-x_0)\dot\theta]^2}$$

$$v_f\begin{bmatrix}\cos(\theta)\\\sin(\theta)\end{bmatrix}\cos(\varphi) + [v_f\sin(\varphi) - (l-x_0)\dot\theta]\begin{bmatrix}\sin(\theta)\\-\cos(\theta)\end{bmatrix} = \vec H(t)vw^* - vk^*\vec E(t)$$

So, $$\cos(\varphi) = \left\langle\begin{bmatrix}\cos(\theta)\\\sin(\theta)\end{bmatrix}, \vec H(t)w^* - k^*\vec E(t)\right\rangle\frac{v}{v_f}$$

$$\sin(\varphi) = \left[\left\langle\begin{bmatrix}\sin(\theta)\\-\cos(\theta)\end{bmatrix}, \vec H(t)w^* - k^*\vec E(t)\right\rangle\frac{v}{v_f} + (l-x_0)\dot\theta\frac{1}{v_f}\right]$$

$$\sin(\varphi) = \left[A\cos(\varphi) + (l-x_0)\dot\theta\frac{1}{v_f}\right]$$

$$A = \frac{\left\langle\begin{bmatrix}\sin(\theta)\\-\cos(\theta)\end{bmatrix}, \vec H(t)w^* - k^*\vec E(t)\right\rangle}{\left\langle\begin{bmatrix}\cos(\theta)\\\sin(\theta)\end{bmatrix}, \vec H(t)w^* - k^*\vec E(t)\right\rangle}$$

$$\sin(\varphi - \psi) = \frac{1}{\sqrt{1+A^2}}(l-x_0)\dot\theta\frac{1}{v_f}$$

$$\psi = \arctan(A)$$

$$\varphi = \arcsin\left[\frac{(l-x_0)\dot\theta}{v_f\sqrt{1+A^2}}\right] + \arctan(A)$$

Mission Manager: A considerable amount of the higher-level processing and decision-making within the autonomous vehicle of the invention is handled by a Mission Manager module. The Mission Manager module coordinates between all other components within the AVS architecture, in addition to monitoring each component for proper operation. The Mission Manager module itself is designed to operate independent of component implementation, so that replacing one type of sensor with one of a different design will not affect proper operation of the vehicle. This software capability complements the configurable hardware capability provided by user or program interface 52 and FPGA 56.

In one embodiment of the invention, a Finite State Machine (FSM) is utilized which is responsible for directing the autonomous vehicle through a sequence of events necessary for successful completion of a pathway directed. An FSM is defined by a set of states that the vehicle can occupy and the transitions between states. These states include such events as driving, passing, waiting at an intersection, and so on. From each of these states, the FSM includes a defined set of "exits," which are transitions that the vehicle can perform to progress from one state to the other. Such an exit could occur when a vehicle blocks the desired path, which may cause the vehicle to change from a "driving" state to a "passing" state.

The FSM can include traffic laws, as such rules generally contain very specific situations in which they are to be applied. Since the actions of the vehicle can only be controlled by one state at a time, the FSM in one embodiment creates a chronological series of behaviors and reasons for initiating those behaviors that can later be analyzed for bugs and logical errors.

The AVS Mission Manager can additionally monitor the Mission Planner component, which performs high-level planning based on the provided Mission Data File (MDF) and Route Network Definition File (RNDF). Once a global plan is created that navigates the vehicle from waypoint to waypoint along the MDF's prescribed checkpoints, modifications to this plan are tracked and verified by the Mission Planner. In one embodiment, roadside devices along highways or other routes may broadcast their geospatial coordinates which the autonomous vehicle receives and processes received signals from the roadside devices in order for the autonomous vehicle to ascertain its position. Accordingly, the object sensor of the vehicle can include component devices remote from the vehicle.

Yet another function of the Mission Manager is to ensure that requests from one component to another do not adversely affect the safe operation of the vehicle. For instance, steering commands that are sent from the steering control module are first verified as appropriate for the vehicle's situation (speed, roll, etc.) by the Mission Manager before being passed on to the vehicle's actuators. The Mission Manager also detects pause commands, and it coordinates the smooth stop of the vehicle.

Yet another function of the Mission Manager is to monitor other autonomous vehicles operating in proximity to the autonomous vehicle of the Mission Manager. One way to monitor the other autonomous vehicles is to have each autonomous vehicle transmits its own location to any other autonomous vehicles on the same network. This capability may well be extended to where each autonomous vehicle (or even other non-autonomous vehicles broadcasting position information) are in communication with each other. One such application would be in mining applications where there are finite course paths and a finite number of vehicles to track.

Figures 1, 12:
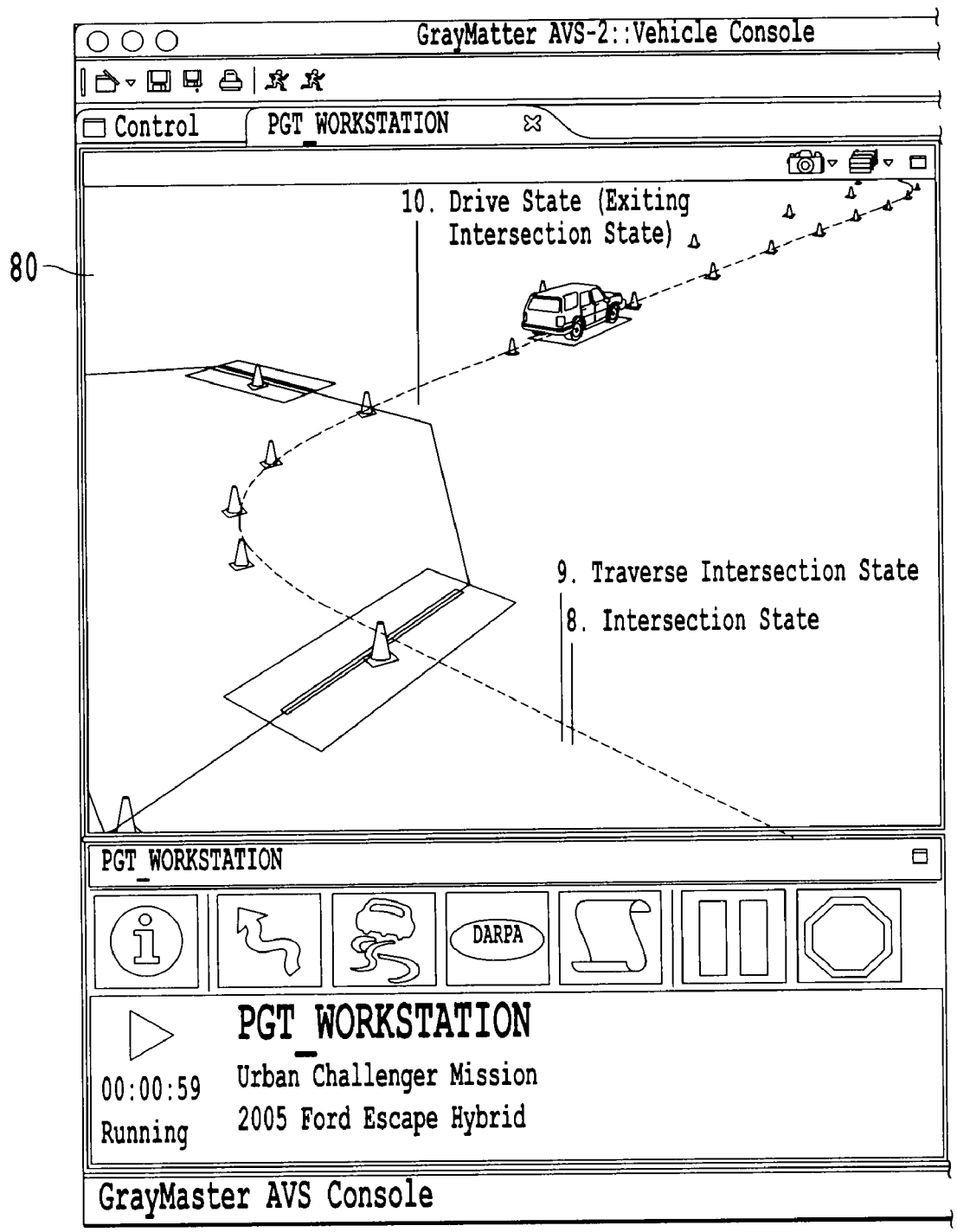
FIG. 12 is an AVS console schematic.
Figures 2, 12:
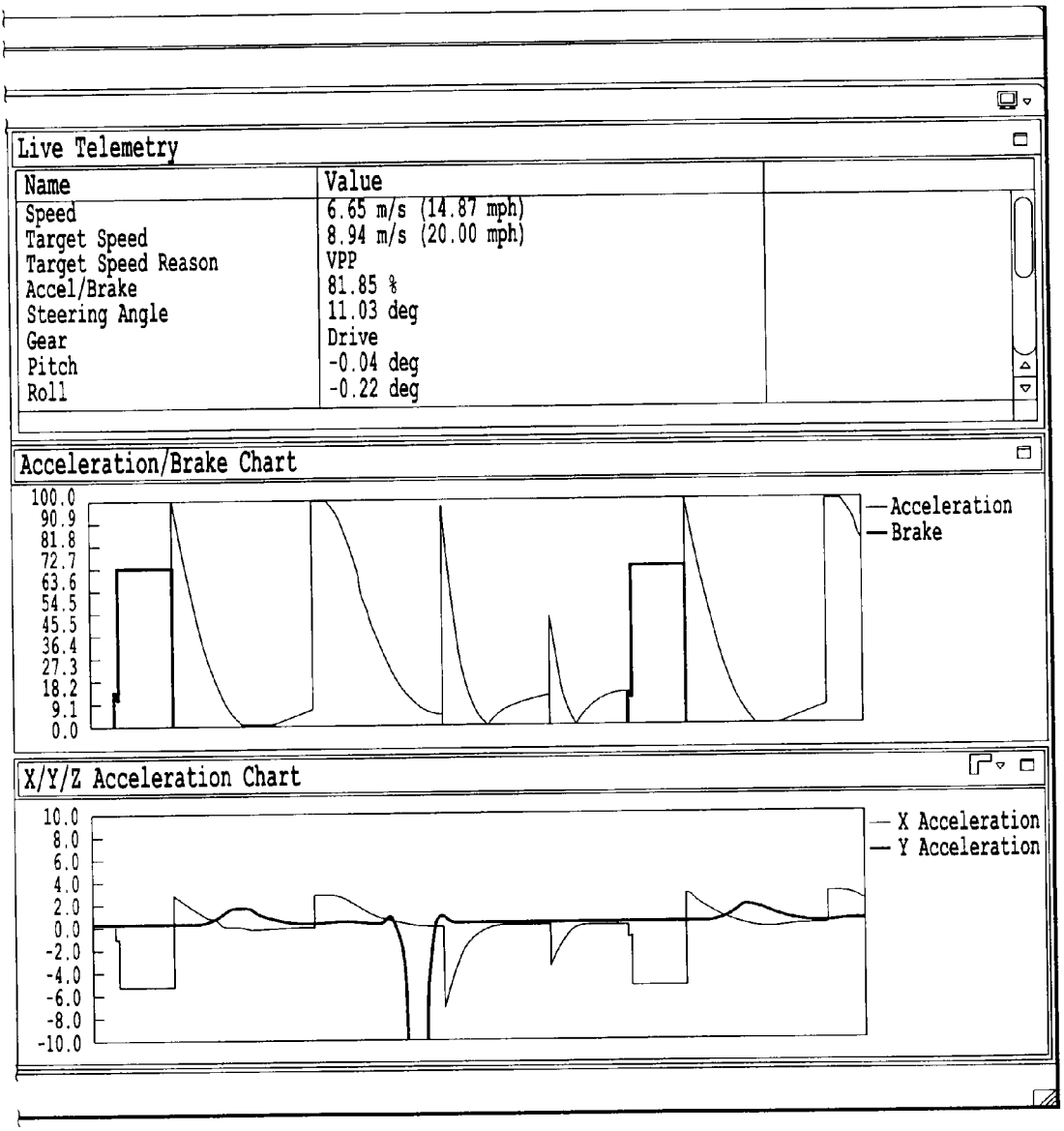

Path Visualization: An AVS Console is a component of the AVS platform that allows for both the realtime display of the autonomous vehicle and its environment and for the replay of previous autonomous vehicle runs. FIG. 12 is an AVS console schematic showing a real time display 80.

Each internal module within the AVS software platform is queried at a regular interval by the logging module. The interval can vary from less than 1 Hz to 250 Hz, depending on how time sensitive the data for each individual module is, depending on any factors deemed appropriate for a particular application.

The AVS platform provides a standardized binary format for how a module should log its data. First, a module writes an 8 byte timestamp representing the last time its internal state was changed. Next, the module writes a 2 byte numerical identifier that is used to identify the module. Next, the module should write a 4 byte integer that contains the length of the module's data. Finally, the module can write its data to memory.

The logging module takes the data for each module and sequentially writes it to the processor's disk drive. The AVS Console retrieves this data at a later time via a TCP connection to facilitate replays of the autonomous vehicle. In addition, the AVS Console uses a combination of UDP and TCP communication to retrieve this data from the AVS in realtime. The AVS Console is not needed to be present to operate autonomously, but if it is present, it will display a realtime view of the autonomous vehicle and its environment.

The logging module waits for a TCP connection from the AVS Console then sends the data for any requested modules to the AVS Console over this same TCP connection. In addition, the data for some modules is sent as a continuous UDP broadcast to any computers on the same Ethernet network as the autonomous vehicle, depending on any factors deemed appropriate for a particular application.

The AVS Console includes a 3D display built with the OpenGL framework. The data for each module is processed by the AVS Console and is then displayed in the 3D display. The type of data that is displayed is dependent on the particular module. Standard data that is always displayed includes the position, attitude, and speed of the vehicle, along with any obstacles that are currently sensed by the autonomous vehicle. For replaying previous runs, the AVS Console can read previously stored data and can load this date into the 3D display.

Figure 13:
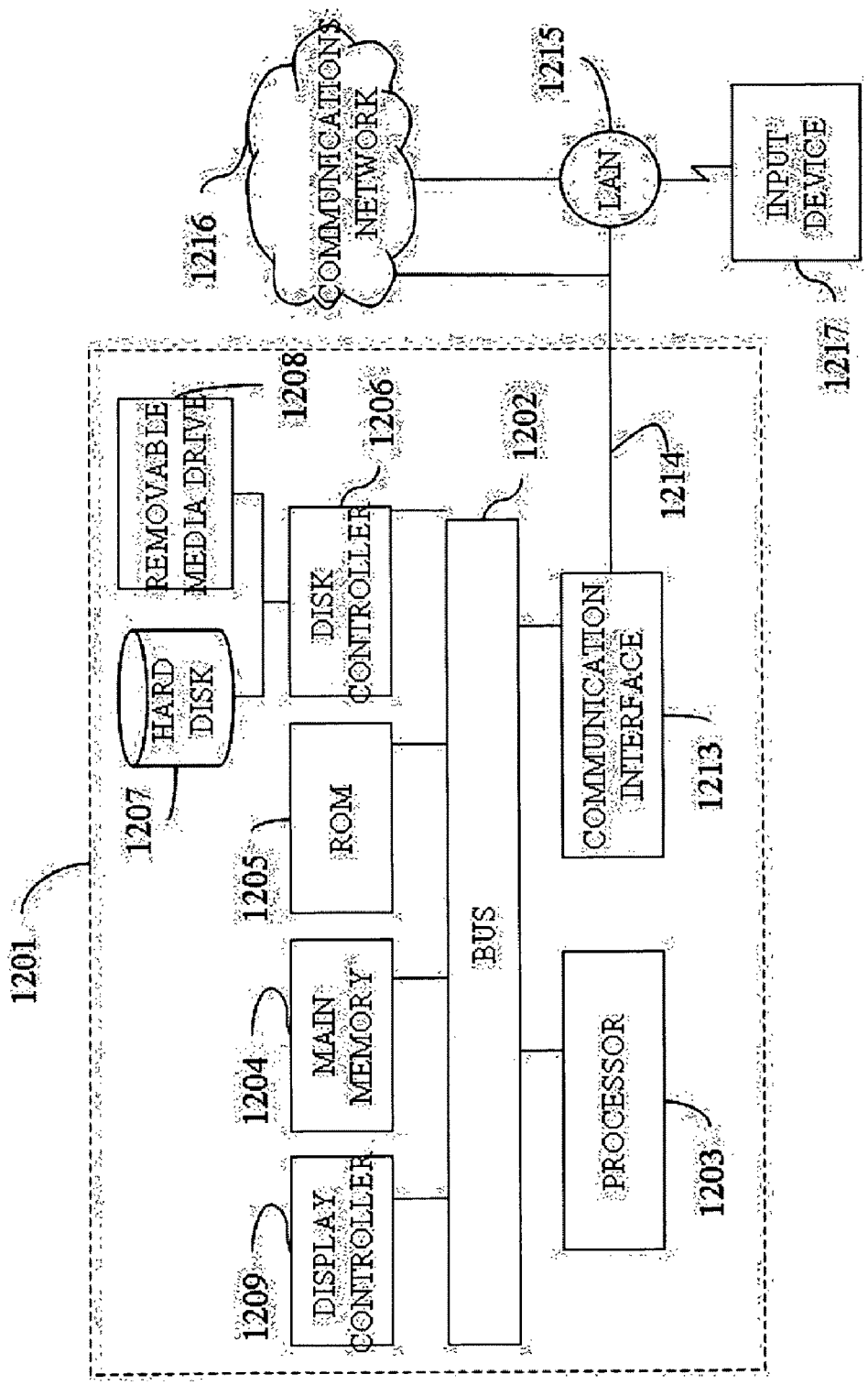
FIG. 13 is a schematic of a computer system suitable for the invention.

Computer Implementation: FIG. 13 illustrates one embodiment of a computer system 1201 in which the processor 24 (or any of the specific processors discussed below) of the invention can be implemented. The computer system 1201 is programmed and/or configured to perform any or all of the functions described above. Further, respective functions can be divided among different computers on board the vehicle. These computers may be in communication with each other via the communications network 1216 (discussed below). The computer system 1201 includes a bus 1202 or other communication mechanism for communicating information, and a internal processor 1203 coupled with the bus 1202 for processing the information. The computer system 1201 includes a memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by the internal processor 1203. In addition, the memory 1204 may be used for storing temporary variables or other intermediate information during the execution of instructions by the internal processor 1203. The computer system 1201 preferably includes a non-volatile memory such as for example a read only memory (ROM) 1205 or other static storage device (e.g., programmable ROM (PROM), erasable PROM (EPROM), and electrically erasable PROM (EEPROM)) coupled to the bus 1202 for storing static information and instructions for the internal processor 1203.

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). The computer system may also include one or more digital signal processors (DSPs) such as the TMS320 series of chips from Texas Instruments, the DSP56000, DSP56100, DSP56300, DSP56600, and DSP96000 series of chips from Motorola, the DSP1600 and DSP3200 series from Lucent Technologies or the ADSP2100 and ADSP21000 series from Analog Devices. Other processors especially designed to process analog signals that have been converted to the digital domain may also be used (as detailed in the working example below).

The computer system 1201 performs a portion or all of the processing steps of the invention in response to the internal processor 1203 executing one or more sequences of one or more instructions contained in a memory, such as the main memory 1204. Such instructions may be read into the main memory 1204 from another computer readable medium, such as a hard disk 1207 or a removable media drive 1208. Such instructions may be read into the main memory 1204 from another computer readable medium, such as a USB flash drives or jump drives. Such drives are solid-state memory devices which have the ability to act as floppy disks or hard drives under most computer operating systems. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media suitable for the invention are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the invention includes software for controlling the computer system 1201, for driving a device or devices for implementing the invention, and for enabling the computer system 1201 to interact with a human user (e.g., a driver). Such software may include, but is not limited to, device drivers, operating systems, development tools, and applications software. Such computer readable media further includes the computer program product of the invention for performing all or a portion (if processing is distributed) of the processing performed in implementing the invention. The computer code devices of the invention may be any interpretable or executable code mechanism, including but not limited to scripts, interpretable programs, dynamic link libraries (DLLs), Java classes, and complete executable programs. Moreover, parts of the processing of the invention may be distributed for better performance, reliability, and/or cost.

The term "computer readable medium" as used herein refers to any medium that participates in providing instructions to the internal processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to internal processor 1203 for execution. For example, the instructions may initially be carried on a disk to a remote computer. An infrared detector coupled to the bus 1202 can receive the data carried in the infrared signal and place the data on the bus 1202. The bus 1202 carries the data to the main memory 1204, from which the internal processor 1203 retrieves and executes the instructions. The instructions received by the main memory 1204 may optionally be stored on storage device 1207 or 1208 either before or after execution by the internal processor 1203.

For instance, in one embodiment of the invention, a computer readable medium contains program instructions for execution on a processor in a vehicle, which when executed by the processor, cause the processor to receive position signals indicative of the location and heading of a vehicle. The received position signals have been normalized by way of a programmable interface to produce normalized position signals. The processor produces from the normalized position signals operation control signals, and outputs the operation control signals to the programmable interface to produce normalized operation control signals which control an operation of the vehicle along an updated travel path for the vehicle.

In one embodiment of the invention, a computer readable medium contains program instructions for execution on a processor in a vehicle, which when executed by the processor, cause the processor to provide at least one of direction and speed control instructions to the vehicle in a drive by wire format, or determine the existence and location of the objects based on storage in the processor of waypoint locations, or direct the vehicle between the waypoints by identification of stationary or moving objects to avoid along the travel path.

In drive by wire technology in the automotive industry, one replaces traditional mechanical and hydraulic control systems with electronic control systems using electromechanical actuators and human-machine interfaces such as pedal and steering feel emulators. Hence, the traditional components such as the steering column, intermediate shafts, pumps, hoses, fluids, belts, coolers and brake boosters and master cylinders are eliminated from the vehicle. The invention in one embodiment facilitates drive by wire capabilities as the autonomous vehicle system platforms FPGA and input/output modules are conducive to interfacing with electronic control systems affecting the steering, braking, and thrust of the autonomous vehicle.

In one embodiment of the invention, a computer readable medium contains program instructions for execution on a processor in a vehicle, which when executed by the processor, cause the processor to translate the locations of the objects relative to the vehicle into geospatial coordinates based on respective distances to the object, respective directions to the object, the heading of the vehicle, and a geospatial position of the vehicle. Inputs from the above-noted GPS and INS systems can be used by processor 24 to accomplish this translation of the object locations.

In one embodiment of the invention, a computer readable medium contains program instructions for execution on a processor in a vehicle, which when executed by the processor, cause the processor to identify a position, velocity, and geometry of one of the obstacles, to predict the position and velocity of the identified obstacle in time, and to estimate a future position of the identified obstacle. A route finding algorithm can determine a route of the vehicle between two waypoints based on recorded traffic patterns between the two waypoints. In one embodiment, the route finding algorithm can determine the route based on at least one of recorded times to travel between the two waypoints, a history of congestion areas between the two waypoints, and real-time reports of congestion. In one embodiment, the route finding algorithm can determine the route based on respective weighted averages for a number of specific travel routes between the two waypoints, respective weighted averages including said at least one of recorded times to travel between the two waypoints, history of congestion areas between the two waypoints, real-time reports of congestion.

In one embodiment of the invention, a computer readable medium contains program instructions for execution on a processor in a vehicle, which when executed by the processor, cause the processor 24 to access (in a map storage area) one or more logical maps of the waypoints which provide directions from one waypoint to another. The logical maps can include geospatial coordinates of the waypoints, intersection waypoints for intersections of roads along a travel path for the vehicle, and times (recorded or calculated) associated with traveling between different waypoints. The processor 24 can be programmed with an obstacle identification algorithm to determine if one of the objects is an obstacle or one of said waypoints by comparison of an object position to the geospatial coordinates of the waypoints.

Further, the computer readable medium of the invention can include program instructions detailing geographical information associated with a particular locale, path planning algorithms (as described below), navigational instructions, instructions particular to an installed image sensor on the vehicle, instructions for command and/or receipt of data from additional sensors such a stereoscopic cameras, or vehicle wheel speed sensors, or receipt of data from driver input control devices or other on-board devices (such as those described later), path planning algorithms, a particularized vehicle transfer function containing data regarding vehicle thrust and response to external forces for the autonomous vehicle in use, and steering control for the autonomous vehicle in use.

For example, the program instructions, in various embodiments of the invention, are configured to cause the processor to process input from a camera which provides an image from one of the sectors. The processor based on the image identifies a lane for the travel path of the autonomous vehicle. The processor can determine if there is an obstacle in the identified lane, and can determine an avoidance path around the obstacle.

The computer system 1201 also includes a communication interface 1213 coupled to the bus 1202. The communication interface 1213 provides a two-way data communication coupling to a network link 1214 that is connected at least temporarily to, for example, a local area network (LAN) 1215, or to another communications network 1216 such as the Internet during downloading of software to the processor 24 or an internal network between multiple computers on board the vehicle. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented as part of the communication interface 1213 to provide data exchange with any of the on-board computers, image sensors, wheel speed sensors, biometric sensors, and/or driver command input devices. In any such implementation, the communication interface 1213 sends and receives electrical, electromagnetic or optical signals that carry digital data streams representing various types of information.

The network link 1214 typically provides data communication through one or more networks to other data devices to provide data exchange with any of the on-board computers, image sensors, wheel speed sensors, biometric sensors, and/or driver command input devices. For example, the network link 1214 may provide a temporary connection to another computer through a local network 1215 (e.g., a LAN) or through equipment operated by a service provider, which provides communication services through a communications network 1216. As shown in FIG. 13, the computing system 1201 can be in communication with an input device 1217 via the local network 1215 and the communications network 1216 which use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to the various GPS and INS systems on board the vehicle. The input device 1217 in various embodiments of the invention provides input to the processor 24 and represents schematically the image sensors, wheel speed sensors, biometric sensors, and/or driver command input devices discussed in the invention.

Application Areas

The invention has widespread application in both autonomously driven and human driven vehicles where the invention functions respectively in a primary or secondary mode.

In general, the invention with various of the attributes described above can be included on a variety of driveable units. Such units in one embodiment of the invention are powered land or water based vehicles, which include for example automobiles, trucks, sport utility vehicles, armored vehicles, boats, ships, barges, tankers, and armored vessels. For watercraft, the invention could be used not only when navigating in weather or nighttime conditions where visibility is limited and avoidance of other watercraft is desired, but also in docking and lock operations where control of the watercraft between dock and lock structures is important to minimize damage to the watercraft of the dock and lock structures.

The invention also has application to aircraft. In particular, the application to high speed aircraft will depend on detector sensitivity and accuracy to determine the existence of objects at a sufficient distance from the plane that the plane can take corrective action. However, airport approach and takeoff where the speeds are not high the invention has utility. For example, on take off and landing, one concern has been whether flocks of birds frequently at the end of the run way area pose risk to engines. Birds are hard to see at distance for the human eye and hard to detect by aircraft radar. Moreover, the invention has application to helicopters, especially rescue helicopters that frequently land in make-shift areas with obstacles many times hidden from the view of the pilot.

Other application areas include lighter-than-air vehicles (e.g., autonomous weather balloons, autonomous border patrol system including for example remote control small aircraft), other small reconnaissance aircraft, and amphibious vehicles (such as for example land-sea assault vehicles including hovercrafts etc.).

In one embodiment of the invention, the driveable unit can be an autonomous vehicle without driver-assisted control or a driver-controlled vehicle with computer-assisted control. The autonomous vehicles find application, according to one embodiment of the invention, in the above noted environmentally dangerous surroundings where a driver would be at risk. The driver-controlled vehicles of the invention find application in the above noted more conventional environments, where the driver may become disoriented or incapable of physically commanding the vehicle as would occur if the driver suffered a medical emergency or if for example the driver became disoriented under an adverse driving condition. Accordingly, in one embodiment of the invention, processor 24 is configured to control the vehicle in an event of driver impairment or in an event of immediate path obstruction or in an event of driver request.

As an illustrative example of this embodiment of the invention, the autonomous vehicle could recognize driver impairment through observing where the driver is driving in comparison to a predetermined path. If the present path of the vehicle and the predetermined path are not similar, the autonomous vehicle could then check, for example, to see if the driver has recently turned the steering wheel and/or pressed on the either the brakes or throttle. Both of the comparison and the steering and brake check can be included in the decision making process, because if the driver were driving on a long straight road with cruise control on, he may not be actively turning the steering wheel or applying brake or throttle. By the same logic, the driver could be driving a path that is not consistent with the autonomous vehicle's path as long as the driver is actively steering the car. In the event that the autonomous vehicle needs to take over, then the autonomous vehicle in one embodiment of the invention first audibly and visibly warns the driver that it is taking over, then second takes over and steers the vehicle to a safe stopping position as smoothly and safely as possible. If the driver wanted to regain control, the autonomous vehicle of the invention, in one embodiment, provides a press-button or other input device for the driver to resume control. In another embodiment of the invention, the driver could press the button (or command input) again to relinquish control to the autonomous vehicle. Hence, the invention provides in various embodiments a cooperative autonomous driving mode.

In another embodiment of the invention, a biometric sensor could represent another input device. In this embodiment, the biometric sensor determines if the driver was actively driving through input to processor 24 from for example a heart rate monitor built into the steering wheel of the vehicle. One example of a heart rate monitor that is suitable for the invention is heart rate used in exercise equipment, which in one embodiment would be integrated into the steering wheel or alternatively could be worn by the driver and be in wireless communication to processor 24. If the processor 24 detected either a complete loss of heart rate or an extremely low heart rate for an extended period of time (for example 5 seconds), the processor 24 is configured to take control of the vehicle. The processor, by monitoring the normal heart rate of the driver when the car was under proper control would have a basis for determining for example if the driver was impaired due to haven fallen asleep at the wheel, having had a stroke, or having had a heart attack. This embodiment could be implemented also in the cooperative mode of operation (discussed above). As before, in one embodiment of the invention, an audible alarm is issued before taking over control of the vehicle and steering the vehicle to a safe stop. If the driver was in fact not impaired, the driver could simply press a button (or other input device) to take control back from the processor 24.

In another embodiment of the invention, the autonomous vehicle can be operated repeatedly over a predetermined course. For instance, a human driver presses a button that turns the autonomous vehicle into record mode. The human drives the vehicle exactly like he would want the autonomous vehicle to drive the course. The human driver then presses the button again, and the autonomous vehicle drives the recorded course over and over again with a very high level of reliability and repeatability. (Repeatability is an issue for automobile testers). This capability is also useful for endurance testing vehicles, where the vehicle is driven offroad in hazardous conditions for days in a row in which currently many human drivers are used to perform this task due to the human body's relative weakness. This capability is also useful for driving a vehicle at consistent speeds for long distances. For example, this capability would be useful in testing a vehicle at highway speeds on a race track for fuel consumption performance.

In another embodiment of the invention, the driveable unit can be used, in conjunction with a mapping program (e.g., running on a laptop), in which the user could select a destination. At this point, the autonomous navigation software would access the mapping software and generate a route (like the software normally does) except in GPS waypoints rather than in human directions like "turn left at main street." At this point, the autonomous vehicle proceeds in normal operation to follow that route. In one embodiment, the mapping software is customized to provide additional information to the autonomous navigation program such as the width of streets and speed limits.

Other application areas for the navigation and control system of the invention include, but are not limited to: 1) agricultural equipment (e.g., gardening equipment) that performs repetitive tasks or tasks on predicted paths such as for example the harvesting of crops from fields, plowing, grass cutting, etc., 2) mining equipment including for example powered carts that could transport for example goods or people through blackout or smoke filled passages that would normally prevent escape, 3) cave exploration equipment, 4) emergency or police vehicles such as for example fire fighting, ambulances, and rescue squads where visibility impairment need not prevent the emergency vehicles from proceeding forward (as discussed below) or vehicles operating in hazardous environmental conditions where manning of the vehicle places the driver at risk, 5) warehouse management equipment used to store/retrieve pallets, boxes, etc., and 6) toys.

As an illustrative example of the application of the autonomous vehicle of the invention to a police vehicle, on the Causeway bridge in New Orleans (the longest bridge in the world at 24 miles long), there is a significant fog season. On mornings with a dense fog, traffic is convoyed across the bridge by a police car driving at 35 mph. The low speed is required due to the extremely short visibility. On mornings with intense fog, the bridge is closed as even convoying is not possible. If the lead police car in the convoy were an autonomous vehicle of the invention operating in the above-noted cooperative mode, the police car could safely convoy in any type of fog, especially when the RIEGL™ imaging sensor is used. The same applies to driving at night. The autonomous vehicle of the invention is not affected by darkness.

Numerous modifications and variations on the invention are possible in light of the above teachings. It is, therefore, to be understood that within the scope of the accompanying claims, the invention may be practiced otherwise than as specifically described herein.

The invention claimed is:

1. A navigation and control system comprising:
one or more position sensors configured to generate position signals indicative of the location and heading of a vehicle;
one or more operation control mechanisms having inputs and producing outputs which control an operation of the vehicle; and
a self-contained autonomous controller disposed remote from the operation control mechanisms, comprising,
a processor configured to receive the position signals from the position sensors and to generate operation control signals defining an updated travel path for the vehicle, and
a programmable interface providing communication among the position sensors, the operation control mechanisms, and the processor, and configured to normalize inputs to the processor from the position sensors and to generate compatible operation control signals applied as the inputs to the operation control mechanisms, whereby the self-contained autonomous controller is configurable for operation with a variety of different sensors and different operation control mechanisms.

2. The system of claim 1, further comprising:
one or more object sensors configured to generate object signals indicative of objects with respect to a travel path of the vehicle,
wherein the processor is configured to receive the object signals from the object sensors, to identify from the object signals objects which are stationary and objects which are moving with respect to the travel path of the vehicle, and to generate operation control signals defining said updated travel path taking into consideration the identified stationary and moving objects and the position signals.

3. The system of claim 2, wherein the programmable interface is configured to provide communication among the position sensors, the object sensors, the operation control mechanisms, and the processor, and is configured to normalize inputs to the processor from the object sensors.

4. The system of claim 2, wherein the object sensors comprise a light detection and ranging device configured to produce a beam and detect a reflection of the beam from the objects.

5. The system of claim 2, wherein the object sensors comprise a laser radar device configured to produce a beam and detect a reflection, at the wavelength of the beam, from the objects.

6. The system of claim 2, wherein the object sensors comprise a camera configured to provide an image of the travel path from which objects are identified.

7. The system of claim 2, further comprising:
a map storage area configured to store logical maps of waypoints along the travel path of the vehicle for use by the self-contained autonomous controller, said logical map including at least one of directions from one waypoint to another, geospatial coordinates of the waypoints, intersections of roads along a travel path for the vehicle,
wherein the processor is programmed with an obstacle identification algorithm to determine if objects detected by the one or more object sensors are said waypoints by comparison of an object position to the geospatial coordinates of the waypoints.

8. The system of claim 1, further comprising:
a program interface configured to enter programming instructions to the programmable interface.

9. The system of claim 1, wherein the processor is configured to provide at least one of direction and speed control instructions to the operation control mechanisms in a drive by wire format whereby the processor electrically controls at least one of engine throttling, vehicle steering, and vehicle braking.

10. The system of claim 1, further comprising:
a map storage area configured to store logical maps of waypoints along the travel path of the vehicle for use by the self contained autonomous controller, said logical map including at least one of directions from one waypoint to another, geospatial coordinates of the waypoints, intersections of roads along a travel path for the vehicle, and
times associated with traveling between different waypoints.

11. The system of claim 1, wherein the position sensor comprises at least one of a global positioning system device or an inertial navigation system.

12. The system of claim 1, wherein the processor comprises:
a variable structure observer configured to identify a position, velocity, and geometry of objects in a vicinity of the vehicle, predict the position and velocity of the identified objects in time, and estimate future positions of the identified objects.

13. The system of claim 1, wherein the processor comprises:
a route finding algorithm configured to determine for said travel path a route of the vehicle between two waypoints based on recorded traffic patterns between the two waypoints.

14. The system of claim 13, wherein the route finding algorithm is configured to determine the route based on at least one of recorded times to travel between the two waypoints, a history of congestion areas between the two waypoints, and real-time reports of congestion.

15. The system of claim 14, wherein the route finding algorithm is configured to determine the route based on respective weighted averages for a number of specific travel routes between the two waypoints, respective weighted averages including said at least one of the recorded times to travel between the two waypoints, the history of congestion areas between the two waypoints, and the real-time reports of congestion.

16. The system of claim 1, further comprising:
a camera configured to provide an image of the travel path; and
said processor based on the image identifies a lane for the travel path of the vehicle.

17. The system of claim 16, wherein said processor is configured to determine if there is an obstruction in the identified lane.

18. The system of claim 1, wherein said processor is configured to determine an avoidance path around at least one of stationary or moving objects.

19. The system of claim 18, wherein said processor is configured to determine said avoidance path by predicting a likelihood of collision with the stationary or moving objects, wherein:
as a first action, a vehicle's velocity is modified along the travel path to determine if there exists a first solution for the avoidance path;
as a second action upon no existence of the first solution, a swerving maneuver is implemented along the travel path to determine if there exists a second solution for the avoidance path; and
as a third action upon no existence of the first solution or the second solution, the vehicle is stopped.

20. The system of claim 18, wherein said processor is configured to determine said avoidance path based on a virtual path analysis utilizing a sliding mode program to predict an optimum trajectory for avoidance of the stationary and moving objects,
wherein said sliding mode analysis is programmed to generate a steering command based on 1) a moving point $(x^*(s), y^*(s))$ of the vehicle from the travel path, 2) a distance $s(t)$ of the vehicle from the travel path, and 3) an error vector $E(t)$ of an actual vehicle position $(x(t), y(t))$ from the moving point $(x^*(s(t)), y^*(s(t)))$,
wherein the error vector $E(t)$ accommodates time dependent non-linear factors capable of causing the vehicle to deviate from the travel path or deviate from an approach path to the travel path.

21. A method for navigation and control of a vehicle, comprising:
generating position signals indicative of the location and heading of a vehicle;
normalizing the position signals by way of a programmable interface to produce normalized position signals;

producing from the normalized position signals operation control signals; and normalizing the operation control signals by way of the programmable interface to produce normalized operation control signals which control an operation of the vehicle along an updated travel path for the vehicle.

22. A drivable unit comprising:

a vehicle including, one or more position sensors configured to generate position signals indicative of the location and heading of a vehicle;

one or more operation control mechanisms having inputs and producing outputs which control an operation of the vehicle; and a self-contained autonomous controller disposed remote from the at least one operation control mechanism, comprising, a processor configured to receive the position signals from the position sensors and to generate operation control signals defining an updated travel path for the vehicle, and a programmable interface providing communication among the position sensors, the operation control mechanisms, and the processor, and configured to normalize inputs to the processor from the position sensors and to generate compatible operation control signals applied as the inputs to the operation control mechanisms, whereby the self-contained autonomous controller is configurable for operation with a variety of different sensors and different operation control mechanisms.

23. The unit of claim 22, wherein the vehicle comprises a land-based vehicle.

24. The unit of claim 23, wherein the land-based vehicle comprises at least one of an automobile, a truck, a sport utility vehicle, rescue vehicle, an agricultural vehicle, a mining vehicle, an escort vehicle, a toy vehicle, a reconnaissance vehicle, a test-track vehicle, and an armored vehicle.

25. The unit of claim 22, wherein the vehicle comprises watercraft.

26. The unit of claim 25, wherein the watercraft comprises at least one of a boat, a ship, a barge, a tanker, an amphibious vehicle, a hovercraft, and an armored ship.

27. The unit of claim 22, wherein the vehicle comprises an autonomous vehicle without driver-assisted control.

28. The unit of claim 22, wherein the vehicle comprises a driver-controlled vehicle with computer-assisted control.

29. The unit of claim 28, wherein the processor is configured to recognize driver impairment.

30. The unit of claim 29, wherein the processor is configured to recognize driver impairment from a biometric sensor or from an analysis of driver-control of the vehicle.

31. The unit of claim 28, wherein the processor is configured to control the vehicle in an event of an input command.

32. A non-transitory computer readable storage medium containing program instructions for execution on a processor in a vehicle, which when executed by the processor, cause the processor to perform the functions of:

receiving position signals indicative of the location and heading of a vehicle, said position signals having been normalized by way of a programmable interface to produce normalized position signals;

producing from the normalized position signals operation control signals; and outputting the operation control signals to the programmable interface to produce normalized operation control signals which control an operation of the vehicle along an updated travel path for the vehicle.

33. A navigation and control system comprising:

one or more operation control mechanisms having inputs and producing outputs which control an operation of a vehicle; and a processor, connected to the one or more operation control mechanisms, configured to generate a steering command based on 1) a moving point $(x^*(s), y^*(s))$ of the vehicle from a travel path, 2) a distance $s(t)$ of the vehicle from the travel path, and 3) an error vector $E(t)$ of an actual vehicle position $(x(t), y(t))$ from the moving point $(x^*(s(t)), y^*(s(t)))$, wherein the error vector $E(t)$ accommodates time dependent non-linear factors capable of causing the vehicle to deviate from the travel path or deviate from an approach path to the travel path.

34. The system of claim 33, wherein the processor is configured to determine a travel direction for the vehicle based on the error vector $E(t)$ satisfying a differential equation of the form $d/dt\, E(t) = -kE(t)$ and converging to zero for an optimum travel direction.

35. The system of claim 33, wherein the processor in determining said moving point $(x^*(s), y^*(s))$ along the travel path includes in the determination the non-linear factors including at least one of a front wheel speed, a rear wheel speed, a degree of slip in between, and vehicle skid.

36. The system of claim 33, wherein the processor in determining said moving point $(x^*(s), y^*(s))$ along the travel path includes in the determination a time derivative of $s(t)$ relative to the travel path to account for said non-linear factors.

\* \* \* \* \*